(12) United States Patent
Lyons et al.

(10) Patent No.: US 12,010,937 B2
(45) Date of Patent: Jun. 18, 2024

(54) TRANSPORT WHEEL ARRANGEMENT FOR A CROP HARVESTING HEADER

(71) Applicant: MacDon Industries Ltd., Winnipeg (CA)

(72) Inventors: Russell George Lyons, Winnipeg (CA); Glen Frank Beamish, Winnipeg (CA)

(73) Assignee: MacDon Industries Ltd., Winnipeg (CA)

( * ) Notice: Subject to any disclaimer, the term of this patent is extended or adjusted under 35 U.S.C. 154(b) by 852 days.

(21) Appl. No.: 16/837,630

(22) Filed: Apr. 1, 2020

(65) Prior Publication Data

US 2021/0307233 A1 Oct. 7, 2021

(51) Int. Cl.
*A01D 41/14* (2006.01)
*A01B 63/00* (2006.01)
*A01B 73/00* (2006.01)
*A01D 75/00* (2006.01)

(52) U.S. Cl.
CPC .......... *A01B 73/005* (2013.01); *A01B 63/006* (2013.01); *A01D 41/145* (2013.01); *A01D 75/002* (2013.01)

(58) Field of Classification Search
CPC ....... A01B 73/005; A01B 63/00–63/32; A01B 73/00; A01D 41/145; A01D 41/14; A01D 41/06; A01D 75/002; A01D 75/004; A01D 67/00–67/04; A01D 34/24
See application file for complete search history.

(56) References Cited

U.S. PATENT DOCUMENTS

| | | | | |
|---|---|---|---|---|
| 3,919,831 A | * | 11/1975 | Halls | A01D 67/005 56/228 |
| 4,460,193 A | * | 7/1984 | Dietz | A01D 67/005 172/383 |
| 5,031,394 A | * | 7/1991 | Honey | A01D 43/077 280/412 |
| 5,243,810 A | | 9/1993 | Fox et al. | |
| 5,970,695 A | | 10/1999 | Dunn | |

(Continued)

FOREIGN PATENT DOCUMENTS

DE 102013209740 A1 * 11/2014 .......... A01B 73/005
FR 3023675 A1 * 1/2016 .......... A01B 73/005

*Primary Examiner* — Thomas B Will
*Assistant Examiner* — Madeline I Runco
(74) *Attorney, Agent, or Firm* — Miller Canfield

(57) ABSTRACT

A header for a crop harvesting machine includes front and rear wheel arrangements that pivot about respective upright axis between a field orientation and a perpendicular transport orientation, while having respective suspensions arrangements movable between different suspended heights. A biasing spring provides lift assist to carry weight of the wheel arrangement during adjustment of the suspension elevation while being isolated from the suspension once set at any one elevation. The front wheel arrangement includes an anti-rotation latch that locks the front wheel in the field orientation automatically upon disconnection of a hitch arm. A second wheel of the rear wheel arrangement can be held in a raised position relative to a first wheel in a field orientation. Load bearing surfaces between the suspended rear wheels and the header frame abut one another when latching to the header frame to isolate the suspension from the header frame in the transport orientation.

15 Claims, 30 Drawing Sheets

(56) References Cited

U.S. PATENT DOCUMENTS

| | | |
|---|---|---|
| 6,209,297 B1 | 4/2001 | Yeomans et al. |
| 7,197,865 B1 | 4/2007 | Enns et al. |
| 7,347,277 B2 | 3/2008 | Enns et al. |
| 8,112,977 B2 * | 2/2012 | Priepke ................ A01B 73/005 |
| | | 56/228 |
| 9,901,032 B2 | 2/2018 | Honey |
| 10,405,481 B2 * | 9/2019 | Chen .................... A01D 75/002 |
| 10,779,473 B2 * | 9/2020 | Jongmans .............. A01D 41/14 |
| 2012/0011822 A1 * | 1/2012 | Honas .................. A01D 75/002 |
| | | 56/228 |
| 2019/0200523 A1 * | 7/2019 | Fay, II et al. ........ A01D 41/145 |
| 2020/0008341 A1 * | 1/2020 | Madarasi ................. B25J 5/007 |
| 2020/0055545 A1 * | 2/2020 | Chen .................... A01B 73/005 |
| 2021/0307234 A1 * | 10/2021 | Jongmans .............. A01D 67/00 |
| 2021/0307249 A1 * | 10/2021 | Jongmans ............ A01D 41/141 |
| 2022/0007578 A1 * | 1/2022 | Trowbridge ......... A01D 41/145 |

\* cited by examiner

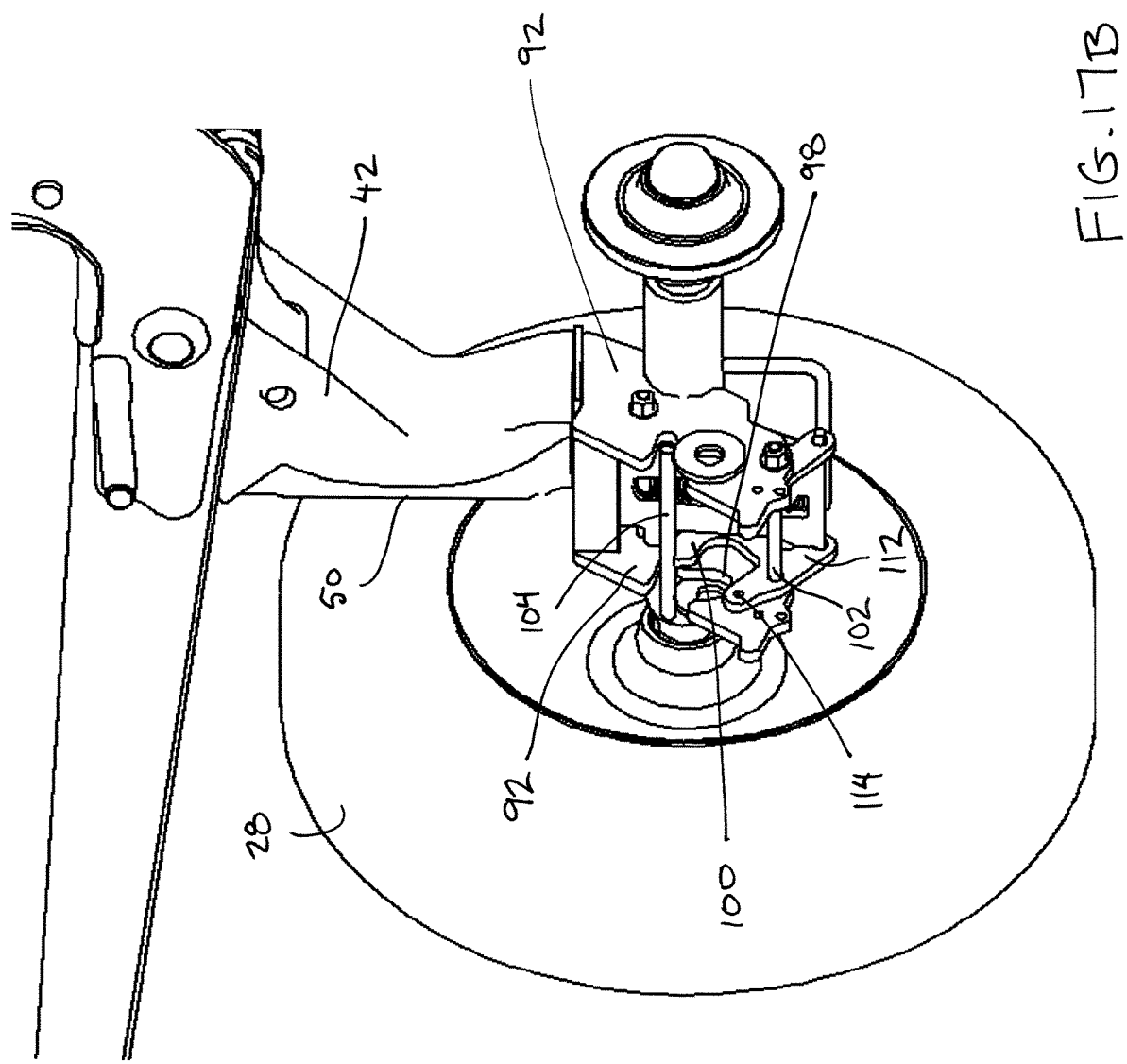

TRANSPORT WHEEL ARRANGEMENT FOR A CROP HARVESTING HEADER

FIELD OF THE INVENTION

The present invention relates to a crop harvesting header including ground wheels which can support the header for rolling movement along the ground, and more particularly the present invention relates to ground wheels for a crop harvesting header by which the header can be trailed in a transport position.

BACKGROUND

Crop harvesting headers generally include a main frame having a main rear structural member extending across a width of the header and a plurality of arms extending forwardly from the main rear structural member to a front edge of the header. At the front edge is mounted a cutter bar carrying a cutting knife so as to cut the standing crop at the forward edge and to allow that standing crop to fall or be directed onto a platform or other support rearward of the cutting knife.

The header generally includes a transport device in the form of an auger or a draper which then carries the cut crop across the header, that is at right angles to the forward direction to a collection area.

Such headers can be used with a combine harvester for supplying the material from a collection area into the feeder housing of the combine harvester or can be used with a swather for depositing the material from the collection area onto the ground in the form a swath.

Such headers can include additional elements such as conditioning rolls which act upon the crop material before or after its movement to the collection area. Such headers may or may not include a reel which can assist in handling the crop as it is cut and moved to the platform or other support area.

The present invention is concerned with the transportation of the header and is not intended to be limited to any particular type of header.

The present invention is particularly concerned with headers of the type which are attached onto a transport vehicle, which is a combine harvester or swather tractor. The vehicle supports the header from behind the main structural member so that the header is presented forwardly of the vehicle with its width transverse to the working direction of movement of the vehicle. The width of the header is necessarily relatively large to provide a wide cutting action and this width is normally larger than can be accommodated through gates or along roads.

One important problem of a header of this type is therefore to provide a transportation arrangement for the header by which it can be separated from the transport vehicle and towed in a direction generally at right angles to the working direction so that its width when towed is significantly reduced relative to the working width.

In U.S. Pat. No. 5,243,810 issued Sep. 14, 1993, of Fox et al assigned to the present assignees MacDon, there is disclosed an arrangement by which the header includes its own transportation wheels which can be rotated from a working position to a transport position so that the header can be separated from the transport vehicle and towed generally by the same transport vehicle in a direction at right angles to its working direction.

With this arrangement there is a single wheel at one end of the header and a tandem wheel arrangement at the opposite end of the header. The single wheel is rotated through 90° and carries a hitch pole which is attached to the towing vehicle. The towing vehicle therefore steers the single wheel at one end of the header. The tandem wheel arrangement initially provides an axle which is at right angles to the direction of working movement and provides two wheels spaced across the width of the header. When moved to the transport position, the axle is turned through 90° so that one wheel moves forwardly of the header to a position in front of the cutter bar so the axle can provide support for the cutter bar. The header is therefore supported in the transport position on the single front wheel and on the transverse rear axle and is towed by steering the front wheel with the hitch pole while the rear axle remains fixed. The single wheel and the tandem wheel arrangement in the working position of the header act as gauge wheels rolling upon the ground and holding the header at a required height relative to the ground.

This arrangement has achieved considerable success and is widely used on headers 30 feet in width and larger.

However in regard to smaller headers of the order of less than 30 feet, the axle arrangement cannot be accommodated and therefore this arrangement is impractical for headers of this size.

An alternative arrangement for transporting a header of this type is to provide a separate trailer onto which the header is placed for towing behind the transport vehicle. However the trailer is inconvenient, relatively expensive and has the problem that it is generally in the wrong place when transport of the header is required.

Honey Bee of Saskatchewan, Canada, show in their brochure a header for attachment to a bidirectional tractor where the tractor is attached at a position adjacent one end of the header and additional ground wheel is provided on the header adjacent the opposed end. The header is moved to a transport position by rotating the header relative to the attachment of the tractor and by actuating the ground wheel to move to a support position underneath the header. The header can therefore be transported in a direction inclined at an angle of the order of 60θ to its normal working direction thus reducing its width. In the transport position, therefore, the header is supported on the hitch of the tractor and upon the additional separate ground wheel. This arrangement is limited to an off-center mounting on the header and to a bidirectional tractor and therefore is unsuitable for more conventional arrangements.

AGCO in their brochure for their 600 header transport arrangement provide a ground wheel at one end of the header which is steered by the towing vehicle and an additional wheel at the opposed end of the header which moves from a folded position underneath the header outwardly to a position in front of the cutter bar. This arrangement does not support the header in a manner which is sufficiently stable.

In U.S. Pat. No. 5,970,695 issued Oct. 26, 1999, of Dunn assigned to the present assignees MacDon, there is disclosed an arrangement where gauge wheels at the rear of the header are turned through 90 degrees and an additional separate wheel is added to the structure as a temporary attachment at the cutter bar.

In U.S. Pat. No. 6,209,297 issued Apr. 3, 2001 of Yeomans assigned to the Deere, there is disclosed an arrangement where, in transport, one wheel is mounted at the rear of the header and one is mounted at the cutter bar. The wheel at the cutter bar is carried on an arm which swings from a stored position inclined rearwardly to an operating position at the cutter bar. The wheels can be removed and stored during field operation or the wheels can be used as gauge wheels during field operation in which case the wheel from the cutter bar is removed from its mounting arm and attached at a different location on the rear of the header.

Examples of pull-type swathers are shown in U.S. Pat. No. 4,573,309 (Patterson), issued Sep. 15, 1987; —U.S. Pat. No. 3,279,158 (Kirkpatrick), issued Oct. 18, 1966; —U.S. Pat. No. 4,346,909 (Hundeby), issued Aug. 31, 1982; —U.S. Pat. No. 3,457,709 (Killbery), issued Jul. 29, 1969 and U.S. Pat. No. 4,460,193 (Dietz), issued Jul. 17, 1984. Further examples are shown in Canadian Patent 973,367 (International Harvester), issued Aug. 26, 1975, and in brochures issued by Co-op Implements and Versatile. In many of these arrangements an additional wheel is added to the header frame at a suitable location so that the header frame is supported on three ground wheels at spaced positions to form a stable structure. In the Versatile arrangement, the outside wheel can be a dual wheel system which rotates about a vertical axis directly between the wheels. The header frame is supported by a jack and a further wheel is added at the hitch end forward of the header frame to provide a stable trailer construction.

U.S. Pat. No. 7,197,865, issued on Apr. 3, 2007 (MacDon Industries Ltd.) provides a transport system for a crop header includes a first and a second wheel arrangement on the header frame adjacent a respective ends for acting as a stabilizer when the header is in the operating position and movable to a transport position for transporting the header when removed from the vehicle in a transport direction generally longitudinal of the header frame and at a right angle to the working direction with each being mounted on the header frame for rotation of a rolling direction between the working position and the transport position, in which the rolling direction is along the transport direction. The wheel arrangement at the rear end includes a second wheel which is mounted on a swing arm so as to be moved to a position adjacent the cutter bar so that the header is stably supported on the first wheel arrangement, the first wheel of the second wheel arrangement and the second wheel of the second wheel arrangement. It may be cumbersome for an operator to displace the swing arm between the two different operating positions.

U.S. Patent Application Publication No. US 2020/0008341, published on Jan. 9, 2020 discloses a cutting unit for an agricultural working machine and a method for adjusting the cutting unit are disclosed. The cutting unit comprises a support body, a cutting device on the support body, a front wheel unit is arranged on the support body on a first half of the cutting unit that has at least one wheel that rotates about a front axle and a rear wheel unit on the support body on a second half of the cutting unit that has at least two wheels that rotate about a rear axle. The front and rear wheel units are rotatable about a respective rotary axis relative to the support body so that the front and rear wheel units can each be transferred between a transport position and a working position. The front and rear wheel units are moved relative to the support body between a high position and a low position using a hydraulic lift cylinder which prevents the wheel units from being resiliently suspended relative to the support body and requires additional hydraulic lines to be supplied to the header for operating the wheel units.

None of these arrangements provide an effective transportation system for a header using ground wheels which can be readily maneuvered by an operator between different elevations for use of the ground wheels as transport wheels, for use of the ground wheels as resiliently suspended gauge wheels at different gauge heights, and/or for storage on the header, and none provide a suitable system for effective attachment of a hitch arm for transport of the header in a trailing arrangement transverse to a normal working direction of the header.

SUMMARY OF THE INVENTION

It is one object of the invention to provide a header with an improved construction for supporting the header in a transport position and particularly which allows easy movement by the operator between the transport and working positions.

According to one aspect of the invention there is provided a header for a crop harvesting machine comprising:
 a header frame having an elongate support structure arranged across a width of the header;
 a mounting assembly attached to the header frame for releasably mounting the header frame on a vehicle in an operating position of the header for movement across ground carrying a crop to be harvested such that, when mounted on the vehicle, the header frame is supported on the vehicle in front of the vehicle for movement with the vehicle in a forward working direction transverse to the width of the header frame;
 the header frame having a plurality of support arms mounted on the support structure and extending therefrom forwardly of the working direction;
 a cutter bar extending across the width of the header having a cutter knife thereon for cutting a standing crop to be deposited into the header frame as the header is moved forwardly over the ground;
 a feed member mounted on the header frame for carrying the deposited crop along the header frame for collection at a discharge area of the header frame;
 a first wheel arrangement on the header frame adjacent a first end of the header frame;
 a second wheel arrangement on the header frame adjacent a second end of the header frame;
 at least one of the first and second wheel arrangements comprising a suspended wheel arrangement, the suspended wheel arrangement comprising:
  a wheel frame supporting a respective ground wheel thereon for rolling movement about a wheel axis of the ground wheel;
  a suspension linkage supporting the wheel frame to be movable relative to the header frame;
  the suspension linkage being movable between at least two different operating positions corresponding to different elevations of the wheel of the suspended wheel arrangement relative to the header frame;
  the wheel frame being resiliently suspended relative to the header frame by the suspension linkage in at least one of the operating positions of the suspension linkage;
  at least one of the operating positions corresponding to the wheel frame supporting the wheel of the suspended wheel arrangement below a bottom side of the header frame so as to support the header frame spaced above the ground for rolling movement on the wheel along the ground; and
  an adjustment biasing member acting on the suspension linkage of the suspended wheel arrangement as the suspension linkage is displaced between the two different operating positions in opposition to a weight of the wheel frame suspended from the header frame;

the adjustment biasing member being movable into a locked condition when located in at least one of the operating positions of the suspension linkage, the biasing member being isolated from the suspension linkage such that the biasing member does not act on the suspension linkage in the locked condition.

The adjustment biasing member acting on the suspension linkage specifically while the suspension linkage is adjusted between different elevations allows the operator to manually displace the suspension linkage between different elevations with a minimum of effort because the weight of the wheel frame is carried by the biasing member. The adjustment of the height of the suspension linkage is further arranged so that the biasing member does not affect performance of the resilient suspension by the suspension linkage.

Preferably at least one of the operating positions of the suspended wheel arrangement comprises a transport position in which the wheel is supported on the wheel frame for pivotal movement between a transport rolling orientation in which the wheel axis of the respective wheel is oriented in the forward working direction of the header frame and a field rolling orientation in which the wheel axis of the respective wheel is oriented transversely to the forward working direction for rolling of the wheel in the forward working direction. The header may further include a latching arrangement arranged to selectively fix the wheel frame relative to the header frame such that the wheel frame is not resiliently suspended relative to the header frame by the suspension linkage in the transport position.

When the header frame includes at least one ground engaging member having a ground engaging surface arranged to engage the ground and at least partially support the header thereon as the header is displaced across the ground in the operating position of the header, one of the operating positions of the suspended wheel arrangement may comprise a storage position in which the wheel is supported above the ground engaging surface of the header frame.

Preferably at least one of the operating positions of the suspended wheel arrangement comprises a gauge position in which (i) the wheel frame supports the wheel of the suspended wheel arrangement below a bottom side of the header frame so as to support the header frame spaced above the ground for rolling movement on the wheel along the ground in the forward working direction of the header frame, and (ii) the wheel frame is resiliently suspended relative to the header frame by the suspension linkage in the gauge position of the suspension linkage. Optionally, two of the operating positions comprise gauge positions, the wheel of the suspended wheel arrangement being resiliently suspended at a different elevation relative to the header frame in each of the two gauge positions.

The wheel frame of the suspended wheel arrangement may comprise a swing arm pivotally coupled to the header frame and supporting the wheel thereon such that the wheel varies in elevation relative to the header frame as the swing arm pivots relative to the header frame, wherein the suspension linkage is operatively connected between the swing arm and the header frame.

An adjustment portion of the suspension linkage may be adjustably movable relative to a designated one of the header frame or the wheel frame so as to displace the suspension linkage between the different operating positions. In this instance, the suspension linkage may further comprise stops on the designated one of the header frame or the wheel frame that selectively fix the adjustment portion relative to the designated one of the header frame or the wheel frame such that biasing member is prevented from acting on the suspension linkage while the wheel frame remains resiliently suspended relative to the header frame by the suspension linkage in at least one of the operating positions of the suspension linkage. The stops may selectively fix the adjustment portion of the suspension linkage relative to the designated one of the header frame or the wheel frame such that biasing member is prevented from acting on the suspension linkage in each of the operating positions of the suspension linkage.

The designated one of the header frame or the wheel frame may include a track formed thereon in which the adjustment portion of the suspension linkage comprises a follower supported for sliding movement along the track between the different operating orientations. Preferably the biasing member acts to displace the follower in one direction along the track. Some of the stops may comprise detents formed along the track so as to be arranged to receive the follower selectively therein. Preferably the biasing member acts on the follower transversely to the track in a direction which urges the follower into the detents.

When a hitch arm is provided for connection at the first end of the header frame so as to apply a pulling force to the header from a tractor in a transport position of the header frame, the first wheel arrangement adjacent the first end of the header frame may comprise the suspended wheel arrangement.

Alternatively, or in addition to the first wheel arrangement, the second wheel arrangement adjacent the second end of the header frame may comprise the suspended wheel arrangement.

According to a second aspect of the present invention there is provided a header for a crop harvesting machine comprising:

a header frame having an elongate support structure arranged across a width of the header;

a mounting assembly attached to the header frame for releasably mounting the header frame on a vehicle in an operating position of the header for movement across ground carrying a crop to be harvested such that, when mounted on the vehicle, the header frame is supported on the vehicle in front of the vehicle for movement with the vehicle in a forward working direction transverse to the width of the header frame;

the header frame having a plurality of support arms mounted on the support structure and extending therefrom forwardly of the working direction;

a cutter bar extending across the width of the header having a cutter knife thereon for cutting a standing crop to be deposited into the header frame as the header is moved forwardly over the ground;

a feed member mounted on the header frame for carrying the deposited crop along the header frame for collection at a discharge area of the header frame;

a first wheel arrangement on the header frame adjacent a first end of the header frame;

a second wheel arrangement on the header frame adjacent a second end of the header frame;

a hitch arm arranged for connection to the first wheel arrangement at the first end of the header frame so as to apply a pulling force to the header from a tractor in a transport position of the header frame;

each of the first and second wheel arrangements comprising:
    a wheel frame coupled to the header frame;
    an axle body supported on the wheel frame;

a ground wheel supported on the axle body for rotation about a respective wheel axis;

the ground wheel being pivotal together with the axle body relative to the wheel frame between a transport rolling orientation corresponding to the wheel axis of the respective wheel being oriented in the forward working direction of the header frame and a field rolling orientation corresponding to the wheel axis of the respective wheel being oriented transversely to the forward working direction for rolling of the wheel in the forward working direction;

the first wheel arrangement further comprising:

a receiver mounted on the axle body and arranged to matingly connect with a mounting portion of the hitch arm;

an anti-rotation member movable between a locked position coupled between the axle body and the wheel frame to prevent pivotal movement of the axle body relative to the wheel frame from the field rolling orientation to the transport rolling orientation and an unlocked position in which pivotal movement of the axle body relative to the wheel frame is unrestricted by the anti-rotation member; a biasing member acting on the anti-rotation member so as to bias the anti-rotation member towards the locked position;

an actuator member coupled to the receiver so as to be movable between a hitched position when a mounting portion of the hitch arm is mated with the receiver on the axle body and an unhitched position when the hitch arm is disconnected from the receiver;

the actuator member being operatively connected to the anti-rotation member such that the anti-rotation member is displaced against the biasing member into the unlocked position in response to the actuator member being displaced into the hitched position by the mounting portion of the hitch arm being mated with the receiver on the axle body.

The combination of an anti-rotation member movable between locked and unlocked positions and an actuator member which is linked to the anti-rotation member allows the condition of the anti-rotation member to be automatically controlled by the attachment and removal of a hitch arm so that an operator is not required to use additional pins for securing the ground wheel in different configurations relative to the header frame.

According to a third aspect of the present invention there is provided a header frame having an elongate support structure arranged across a width of the header;

a mounting assembly attached to the header frame for releasably mounting the header frame on a vehicle in an operating position of the header for movement across ground carrying a crop to be harvested such that, when mounted on the vehicle, the header frame is supported on the vehicle in front of the vehicle for movement with the vehicle in a forward working direction transverse to the width of the header frame;

the header frame having a plurality of support arms mounted on the support structure and extending therefrom forwardly of the working direction;

a cutter bar extending across the width of the header having a cutter knife thereon for cutting a standing crop to be deposited into the header frame as the header is moved forwardly over the ground;

a feed member mounted on the header frame for carrying the deposited crop along the header frame for collection at a discharge area of the header frame;

a first wheel arrangement on the header frame adjacent a first end of the header frame, the first wheel arrangement including a ground wheel supported for rotation about a respective wheel axis;

a second wheel arrangement on the header frame adjacent a second end of the header frame, the second wheel arrangement including a ground wheel supported for rotation about a respective wheel axis;

a hitch arm for connection at the first end of the header frame so as to apply a pulling force to the header from a tractor in a transport position of the header frame;

the second wheel arrangement further comprising:

an axle body rotatably supporting the ground wheel thereon for rotation about the wheel axis of the ground wheel;

the axle body being pivotal relative to the wheel frame about an upright axis between a transport rolling orientation in which the wheel axis of the respective wheel is oriented in the forward working direction of the header frame and a field rolling orientation in which the wheel axis of the respective wheel is oriented transverse to the forward working direction for rolling of the wheel in the forward working direction;

a second wheel;

a connecting frame supporting the second wheel relative to the axle body such that the second wheel is pivotal together with the axle body between the transport rolling orientation and the field rolling orientation of the ground wheel;

the connecting frame being positionable in the transport rolling orientation such that both the ground wheel and the second wheel are arranged to engage the ground to support the header frame for rolling movement along the ground thereon in the transport rolling orientation; and the connecting frame being positionable relative to the header frame in the field rolling orientation such that the second wheel is supported at greater elevation than the ground wheel and such that the second wheel is spaced above the ground when the ground wheel engages the ground to support the header frame for rolling movement along the ground thereon in the field rolling orientation.

Positioning the second wheel in contact with the ground in the transport position increases the stability of the header when towed, while enabling the second wheel to be elevated relative to the first ground wheel of the rear wheel arrangement in the field working position eliminates damage to crops by rolling contact of an additional wheel along the ground while maintaining the second wheel readily positioned on the header for displacement into the transport position when required.

In this instance, the header preferably further includes a field mounting arrangement on the header frame arranged to selectively mount the connecting frame thereon in the field rolling orientation of the ground wheel.

Preferably the ground wheel on the axle body is resiliently supported relative to the header frame by the suspension linkage in the field rolling orientation, and the field mounting arrangement on the header frame allows relative movement between the connecting frame and the header frame about at least two different axes.

More particularly, the second wheel arrangement may further comprise: (i) a wheel frame supporting the respective ground wheel thereon for rolling movement about the respective wheel axis of the ground wheel, (ii) and a suspension linkage supporting the wheel frame to be movable relative to the header frame in the field rolling orientation, in which (iii) the ground wheel on the axle body is resiliently supported relative to the header frame by the suspension linkage in the field rolling orientation, and (iv) the field mounting arrangement on the header frame allows relative movement between the connecting frame and the header frame about at least two different axes.

The connecting frame may be pivotally supported on the axle body so as to be pivotal about a frame axis oriented perpendicularly to the upright axis between a first elevation of the second wheel at a common elevation of the ground wheel in the transport rolling orientation and a second elevation of the second wheel spaced above spaced above the common elevation of the ground wheel in the field rolling orientation.

The header may further include a second wheel biasing member acting on the connecting frame in opposition to a weight of the second wheel suspended from the axle body as the connecting frame is displaced between the transport rolling orientation and the field rolling orientation. Preferably the second wheel biasing member is operatively connected between the connecting frame and the axle body.

Preferably the header further includes a transport mounting arrangement on the header frame arranged to selectively mount the connecting frame thereon in the transport rolling orientation.

Preferably, the transport mounting arrangement secures the wheel frame and the suspension linkage in fixed relation to the header frame in the transport rolling orientation.

More particularly, the second wheel arrangement may further comprise (i) a wheel frame supporting the respective ground wheel thereon for rolling movement about the respective wheel axis of the ground wheel, (ii) a suspension linkage supporting the wheel frame to be movable relative to the header frame in the field rolling orientation, (iii) a first load bearing surface on the wheel frame, and (iv) a second load bearing surface on the connecting frame, (v) wherein the first and second load bearing surfaces are in abutment with one another when the connecting frame is secured to the header frame by the transport mounting arrangement.

The transport mounting arrangement noted above, may comprise at least one catch formed on the header frame at a bottom side of the header frame in proximity to the cutter bar and a latch assembly which is supported on the connecting frame for movement between latched and released positions relative to the at least one catch. The axle body may be supported at a rear end of one of the support arms of the header frame and said at least one catch may be formed on a front end of said one of the support arms of the header frame.

The header may include a pair of catches along the edges of respective plates which protrude from the header frame in opposing directions relative to one another and the latch member comprises a pair of hooks arranged to be hooked onto respective ones of the pair of catches in the latched position of the latch assembly.

The catch may be formed along an edge of a load bearing plate on the header frame, in which the load bearing plate is abutted against at least one corresponding load bearing member of the latch assembly, the at least one corresponding load bearing member of the latch assembly being fixed relative to the connective frame.

According to another aspect of the present invention there is provided a header for a crop harvesting machine comprising:
  a header frame having an elongate support structure arranged across a width of the header;
  a mounting assembly attached to the header frame for releasably mounting the header frame on a vehicle in an operating position of the header for movement across ground carrying a crop to be harvested such that, when mounted on the vehicle, the header frame is supported on the vehicle in front of the vehicle for movement with the vehicle in a forward working direction transverse to the width of the header frame;
  the header frame having a plurality of support arms mounted on the support structure and extending therefrom forwardly of the working direction; a cutter bar extending across the width of the header having a cutter knife thereon for cutting a standing crop to be deposited into the header frame as the header is moved forwardly over the ground;
  a feed member mounted on the header frame for carrying the deposited crop along the header frame for collection at a discharge area of the header frame; a first wheel arrangement on the header frame adjacent a first end of the header frame, the first wheel arrangement including a ground wheel supported for rotation about a respective wheel axis;
  a second wheel arrangement on the header frame adjacent a second end of the header frame, the second wheel arrangement including a ground wheel supported for rotation about a respective wheel axis;
  a hitch arm for connection at the first end of the header frame so as to apply a pulling force to the header from a tractor in a transport position of the header frame;
  the second wheel arrangement further comprising:
    an axle body rotatably supporting the ground wheel thereon for rotation about the wheel axis of the ground wheel;
    a wheel frame supporting the axle body thereon for pivotal movement of the axle body relative to the wheel frame about an upright axis in the transport position of the header frame;
    a suspension linkage supporting the wheel frame to be resiliently suspended relative to the header frame;
    the axle body being pivotal relative to the wheel frame about the upright axis between a transport rolling orientation in which the wheel axis of the respective wheel is oriented in the forward working direction of the header frame and a field rolling orientation in which the wheel axis of the respective wheel is oriented transverse to the forward working direction for rolling of the wheel in the forward working direction;
    a second wheel;
    a connecting frame supporting the second wheel relative to the axle body such that the second wheel is pivotal together with the axle body between the transport rolling orientation and the field rolling orientation of the ground wheel; and
    a transport mounting arrangement on the header frame arranged to selectively mount the connecting frame thereon in the transport rolling orientation;
    the transport mounting arrangement comprising at least one catch formed on the header frame at a bottom side of the header frame in proximity to the cutter bar and a latch member which is supported on the connecting frame for movement between latched and released positions relative to the at least one catch.

Preferably said at least one catch is formed on a front end of said one of the support arms of the header frame. In this arrangement, the second wheel of a rear wheel arrangement used for stability in the transport position of the header can be readily secured relative to the header frame using a minimum structure that remains in proximity to the cutter bar in the field working position to minimize where and interference by the transport mounting arrangement when in the field working position.

Preferably said at least one catch comprises a pair of catches along the edges of respective plates which protrude from the header frame in opposing directions relative to one another and the latch member comprises a pair of hooks arranged to be hooked onto respective ones of the pair of catches in the latched position of the latch assembly.

Preferably said at least one catch is formed along an edge of a load bearing plate on the header frame and wherein the load bearing plate is abutted against at least one corresponding load bearing member of the latch assembly, the at least one corresponding load bearing member of the latch assembly being fixed relative to the connective frame.

According to a further aspect of the present invention there is provided a header for a crop harvesting machine comprising:

- a header frame having an elongate support structure arranged across a width of the header,
- a mounting assembly attached to the header frame for releasably mounting the header frame on a vehicle in an operating position of the header for movement across ground carrying a crop to be harvested such that, when mounted on the vehicle, the header frame is supported on the vehicle in front of the vehicle for movement with the vehicle in a forward working direction transverse to the width of the header frame;
- the header frame having a plurality of support arms mounted on the support structure and extending therefrom forwardly of the working direction;
- a cutter bar extending across the width of the header having a cutter knife thereon for cutting a standing crop to be deposited into the header frame as the header is moved forwardly over the ground;
- a feed member mounted on the header frame for carrying the deposited crop along the header frame for collection at a discharge area of the header frame;
- a first wheel arrangement on the header frame adjacent a first end of the header frame, the first wheel arrangement including a ground wheel supported for rotation about a respective wheel axis;
- a second wheel arrangement on the header frame adjacent a second end of the header frame, the second wheel arrangement including a ground wheel supported for rotation about a respective wheel axis;
- a hitch arm for connection at the first end of the header frame so as to apply a pulling force to the header from a tractor in a transport position of the header frame;
- the second wheel arrangement further comprising:
  - an axle body rotatably supporting the ground wheel thereon for rotation about the wheel axis of the ground wheel;
  - a wheel frame supporting the axle body thereon for pivotal movement of the axle body relative to the wheel frame about an upright axis in the transport position of the header frame;
  - a suspension linkage supporting the wheel frame to be resiliently suspended relative to the header frame;
  - the axle body being pivotal relative to the wheel frame about the upright axis between a transport rolling orientation in which the wheel axis of the respective wheel is oriented in the forward working direction of the header frame and a field rolling orientation in which the wheel axis of the respective wheel is oriented transverse to the forward working direction for rolling of the wheel in the forward working direction,
  - a second wheel;
  - a connecting frame supporting the second wheel relative to the axle body such that the second wheel is pivotal together with the axle body between the transport rolling orientation and the field rolling orientation of the ground wheel;
  - a transport mounting arrangement on the header frame arranged to selectively mount the connecting frame thereon in the transport rolling orientation;
  - a first load bearing surface on the wheel frame; and
  - a second load bearing surface on the connecting frame;
  - the first and second load bearing surfaces being in abutment with one another such that the wheel frame is no longer resiliently suspended relative to the header frame when the connecting frame is secured to the header frame by the transport mounting arrangement.

Preferably the second load bearing surface is mounted on the connecting frame in proximity to a rear of the header frame.

The header may further comprise an auxiliary load bearing surface on the connecting frame in abutment with the header frame in proximity to a front of the header frame when the connecting frame is secured to the header frame by the transport mounting arrangement.

The first and second load bearing surfaces between the connecting frame and the header frame allow the first ground wheel of the rear wheel arrangement to be resiliently suspended relative to the header frame in the field working position, while automatically fixing the wheel frame relative to the header frame to lock the wheel suspension by simple abutment of the load bearing surfaces in the transport position without any manual placement of pins being required of an operator.

BRIEF DESCRIPTION OF THE DRAWINGS

One embodiment of the invention will now be described in conjunction with the accompanying drawings in which:

FIG. 17B is a perspective view of the first wheel arrangement in the open position of the anti-rotation member ready to accept connection of the hitch arm therein;

In the drawings like characters of reference indicate corresponding parts in the different figures.

DETAILED DESCRIPTION

Figure 1:
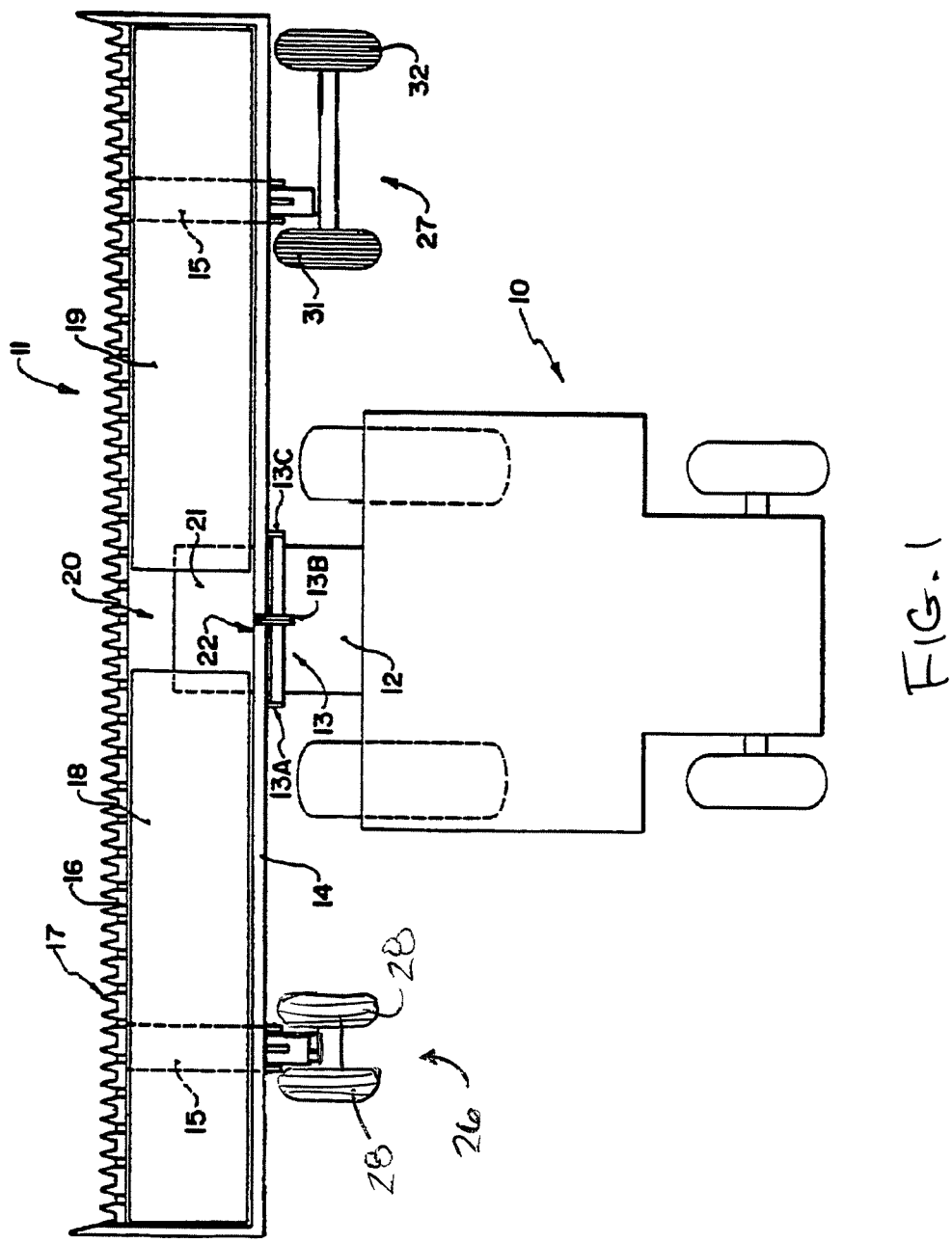
FIG. 1 is a top plan view of a combine harvester including a header according to the present invention showing the ground wheels thereof in the field working position.

Reference is made to U.S. Pat. Nos. 5,005,343 and 5,243,810 of the present assignees which show some detail of the header on which the design of the present embodiment is based. That header is generally used in conjunction with a conventional combine harvester generally indicated at 10 with a header indicated at 11.

The conventional combine harvester is shown only schematically and includes a feeder housing 12 through which the crop from the header is intended to pass into the main body of the combine harvester. The feeder housing includes a front mounting section 13 shown only schematically which is coupled to the header to provide support of the header for movement across the ground.

Most conventional headers are rigidly coupled to the front of the feeder housing so as to remain at the predetermined orientation directly across the front of the combine harvester. The present header is however mounted in a manner including a linkage including as shown three links 13A, 13B and 13C or four links which allow some pivotal movement of the header to occur about a horizontal axis extending forwardly along the line of intended working direction of the combine harvester.

The header conventionally comprises a main frame tube 14 extending along the full length of the header which acts as the main backbone providing rigidity to the header and defining a width of the header perpendicular to the forward working direction. The frame further includes a plurality of generally L-shaped frame members or support arms 15 which extend vertically downwardly from the tube 14 and then have a leg section extending forwardly from a lower end of the vertical portion. At the forward end of the L-shaped leg sections is provided a flange 16 on which is mounted a conventional sickle knife 17 for cutting the standing crop. The standing crop is transported inwardly of the header by a pair of side drapers 18 and 19 which provide an upper run of the canvas extending from the outside end of the header inwardly toward a central section generally indicated at 20. At the central section is provided a feed draper 21 which moves the crop which has been fed to the center section rearwardly through an opening 22 at the feeder housing. A rotating confining and feeding member is provided at the feeder housing to assist in directing the material downwardly and rearwardly into the feeder housing for proper supply to the combine harvester. A reel is mounted on reel arms supported from the tube 14 in conventional manner.

All of the above features are shown and described in the above mentioned US patents and further details can be obtained from study of these patents. For convenience of illustration the reel and the confining member are omitted from the figures.

Figure 2:
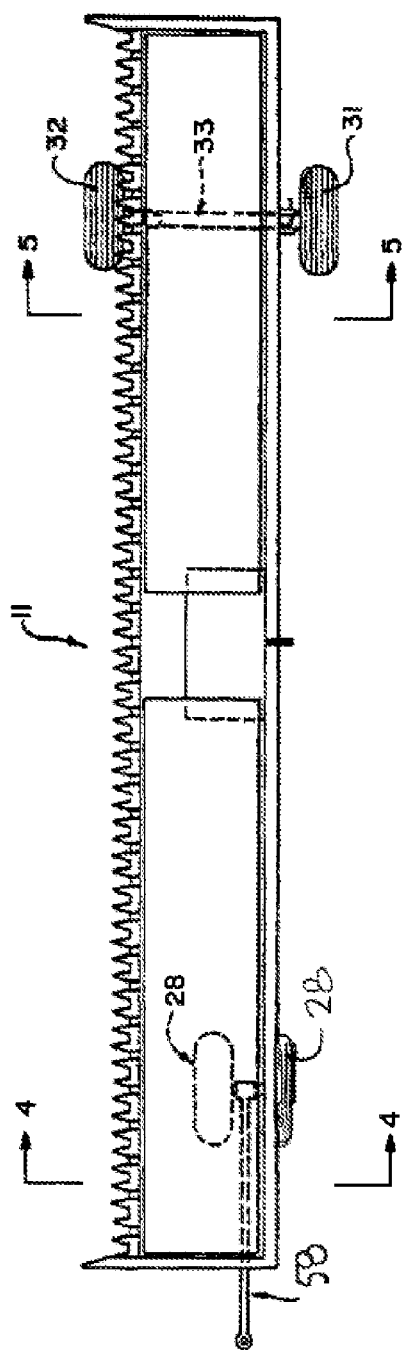
FIG. 2 is a top plan view of the header of FIG. 1 showing the ground wheels in the transport position.

The previous machine of the present assignees also includes a pair of gauge wheels mounted on the rear part of the L-shaped frames or support arms 15 so as to project rearwardly from the frame in a manner similar to that shown in FIG. 2. However in the previous machine the gauge wheels are simply provided to act as gauge wheels and are spring loaded into engagement with the ground. In the transportation of the machine previously manufactured, the header is simply mounted on a separate trailer in conventional manner whereupon the gauge wheels do not in any way assist in the transportation process.

The machine as shown herein however is modified so that the gauge wheels can also be used for the transportation of the header when the header is disconnected from the combine harvester.

The gauge wheels therefore comprise a first wheel arrangement generally indicated at 26 adjacent a left end of the header or front end of the header during transport and a second wheel arrangement generally indicated at 27 adjacent a right end of the header or rear end of the header during transport.

Figure 3:
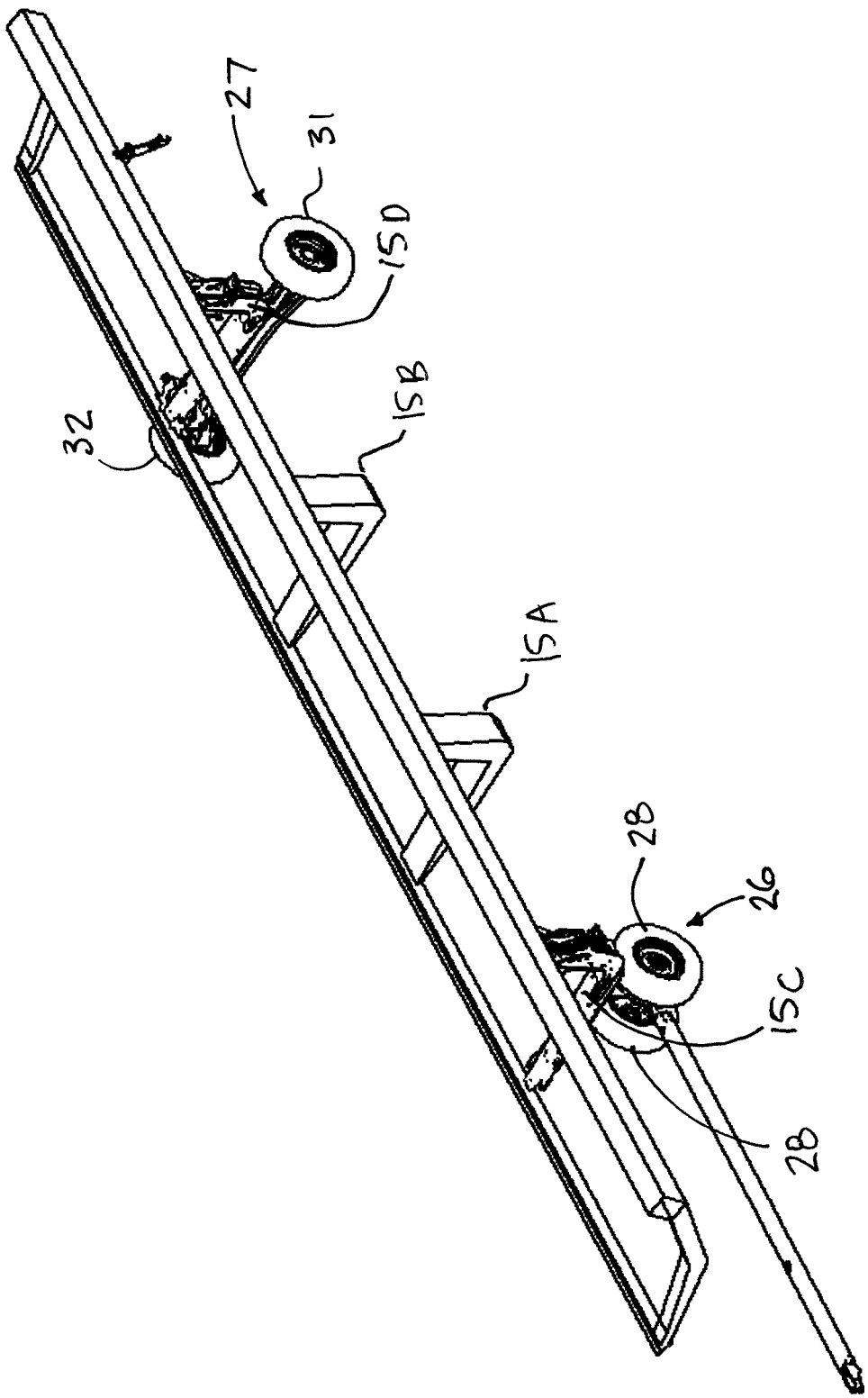
FIG. 3 is a perspective view of the header of FIG. 1 showing the ground wheels of the first wheel arrangement in the storage position.
Figure 4:
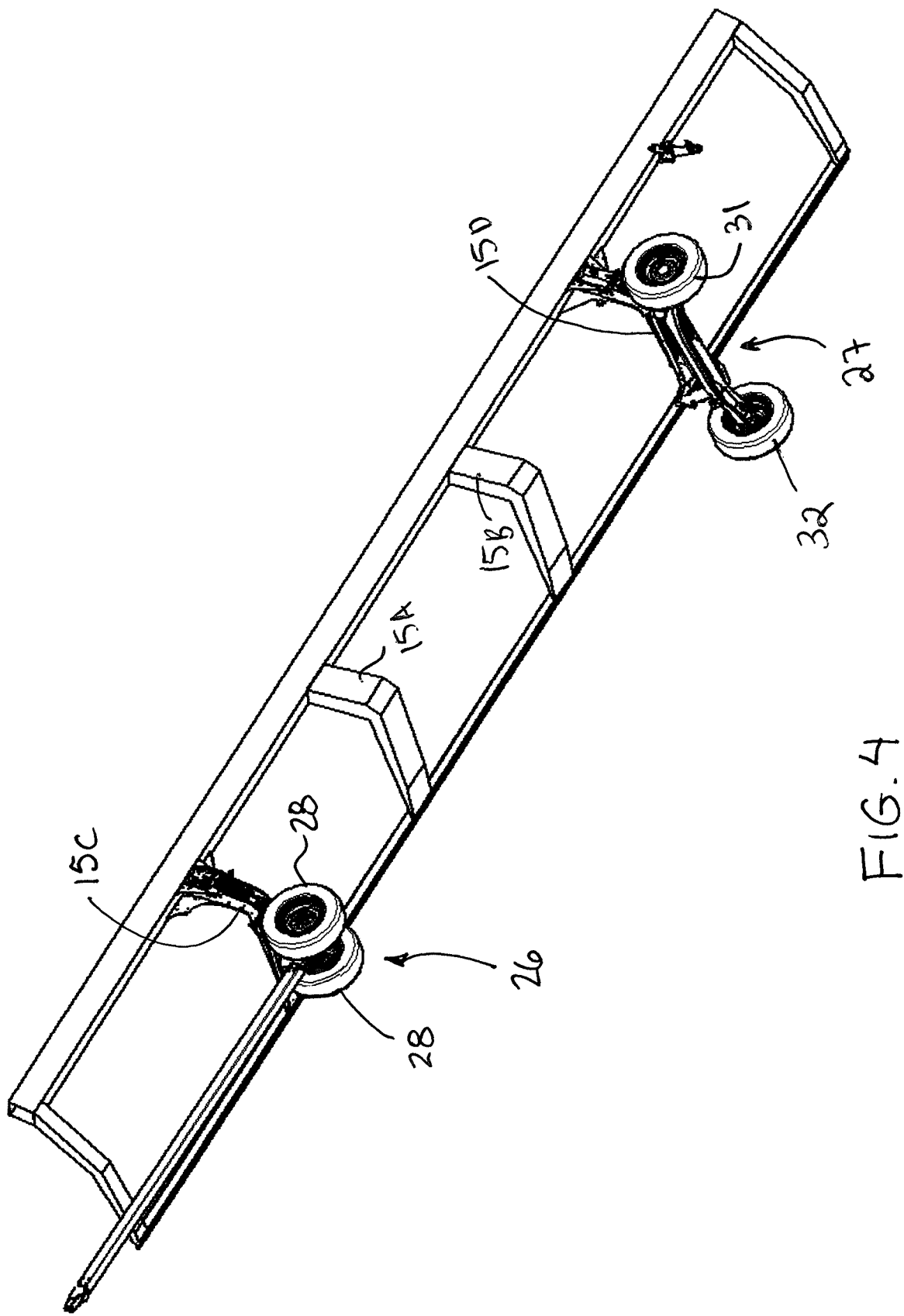
FIG. 4 is a perspective view of the header of FIG. 1 showing the ground wheels of the second wheel arrangement in the transport position.
Figure 5:
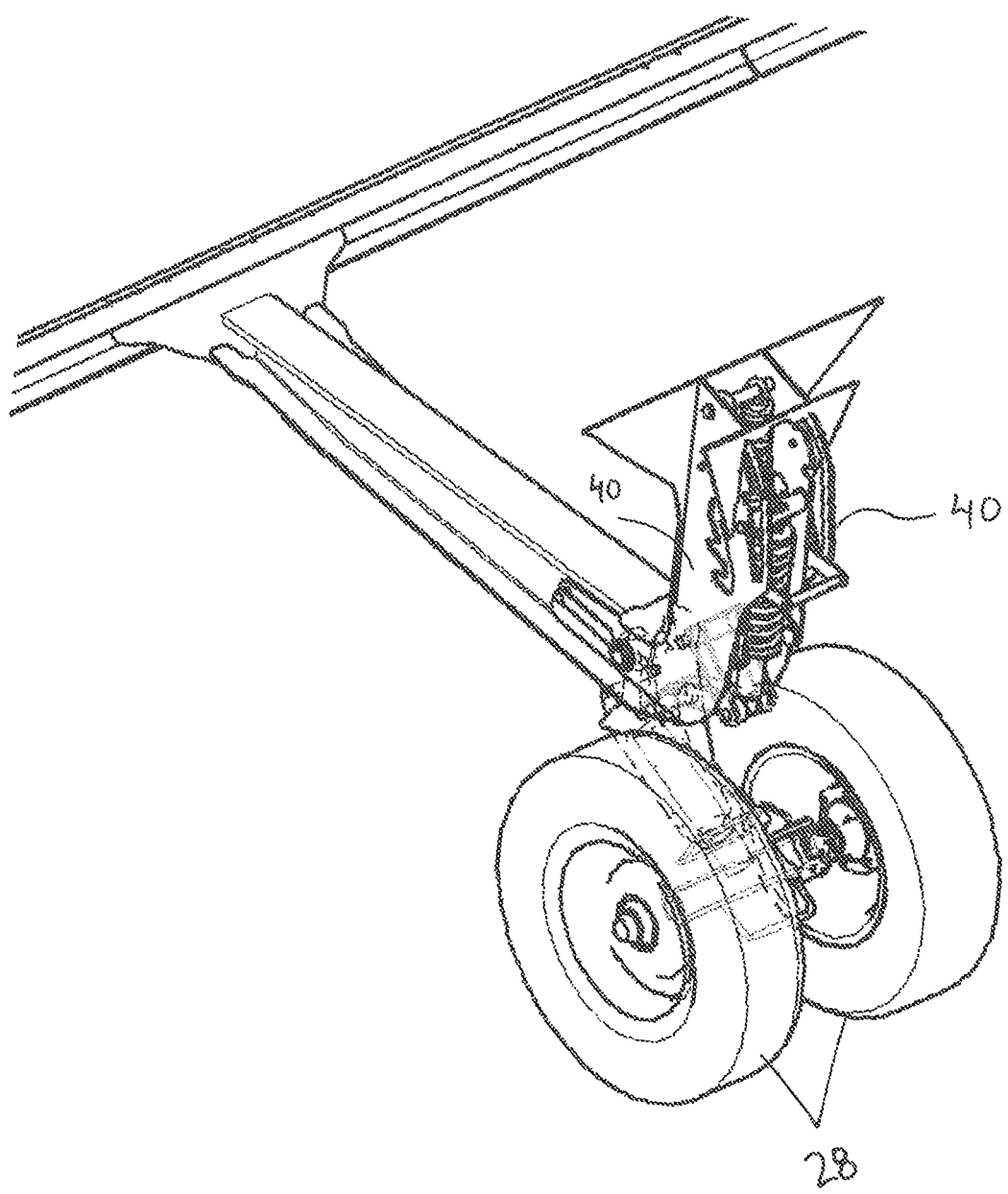
FIG. 5 is a perspective view of the first wheel arrangement in a first gauge position.
Figure 6:
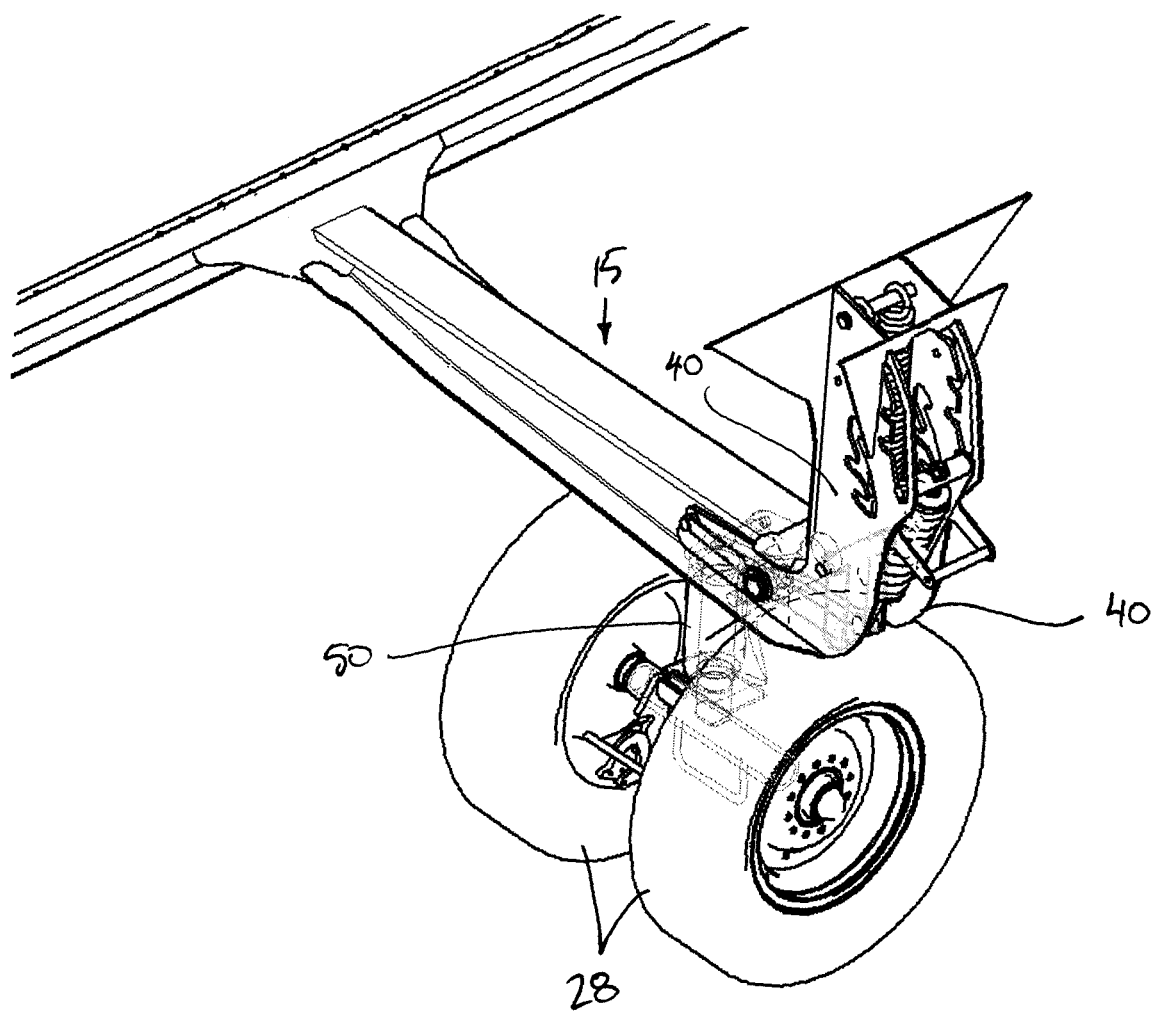
FIG. 6 is a perspective view of the first wheel arrangement in a transport position with the wheels thereof rotated into the transport rolling orientation.
Figure 7:
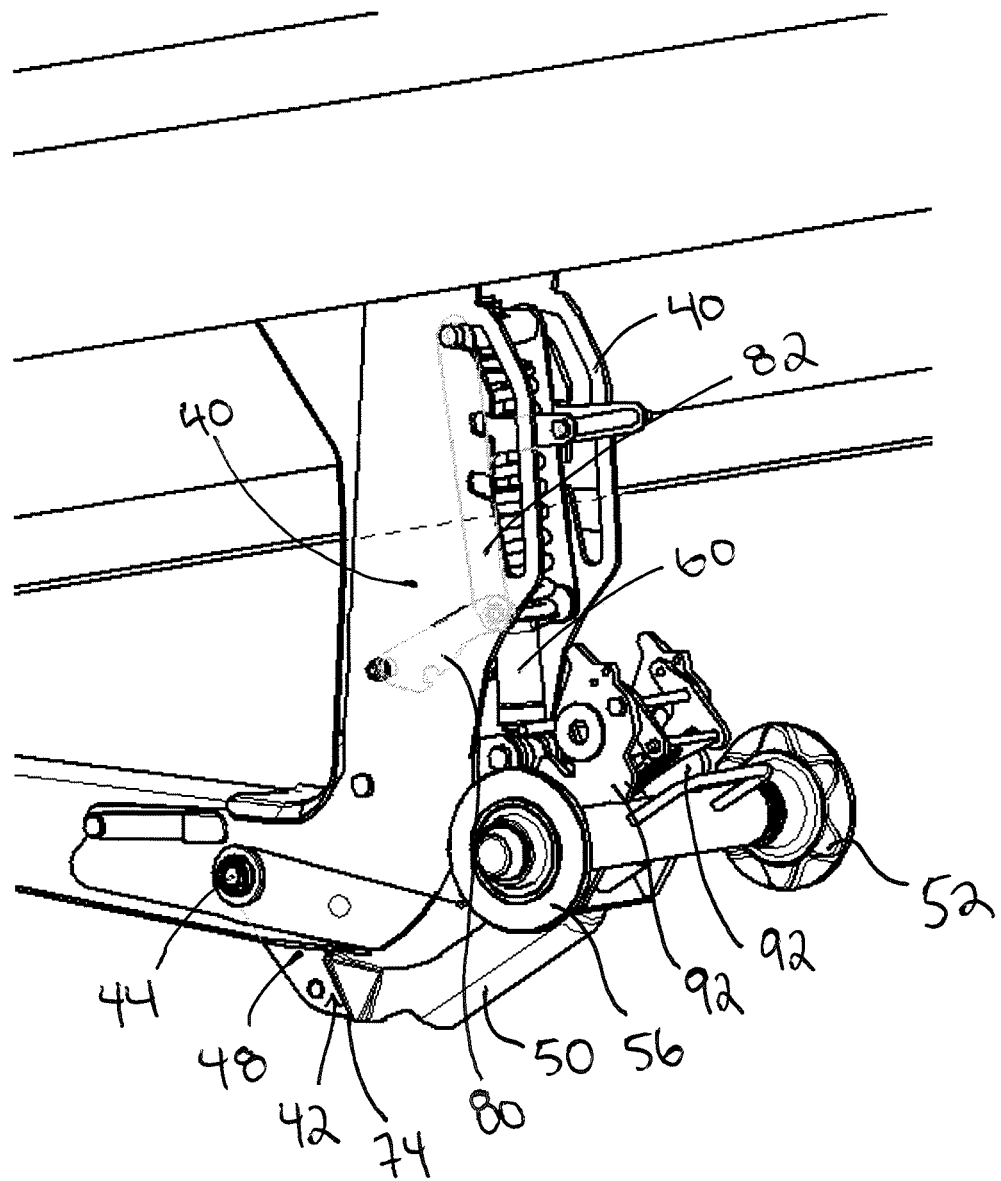
FIG. 7 is an enlarged perspective view of the first wheel arrangement in the storage position.
Figure 8:
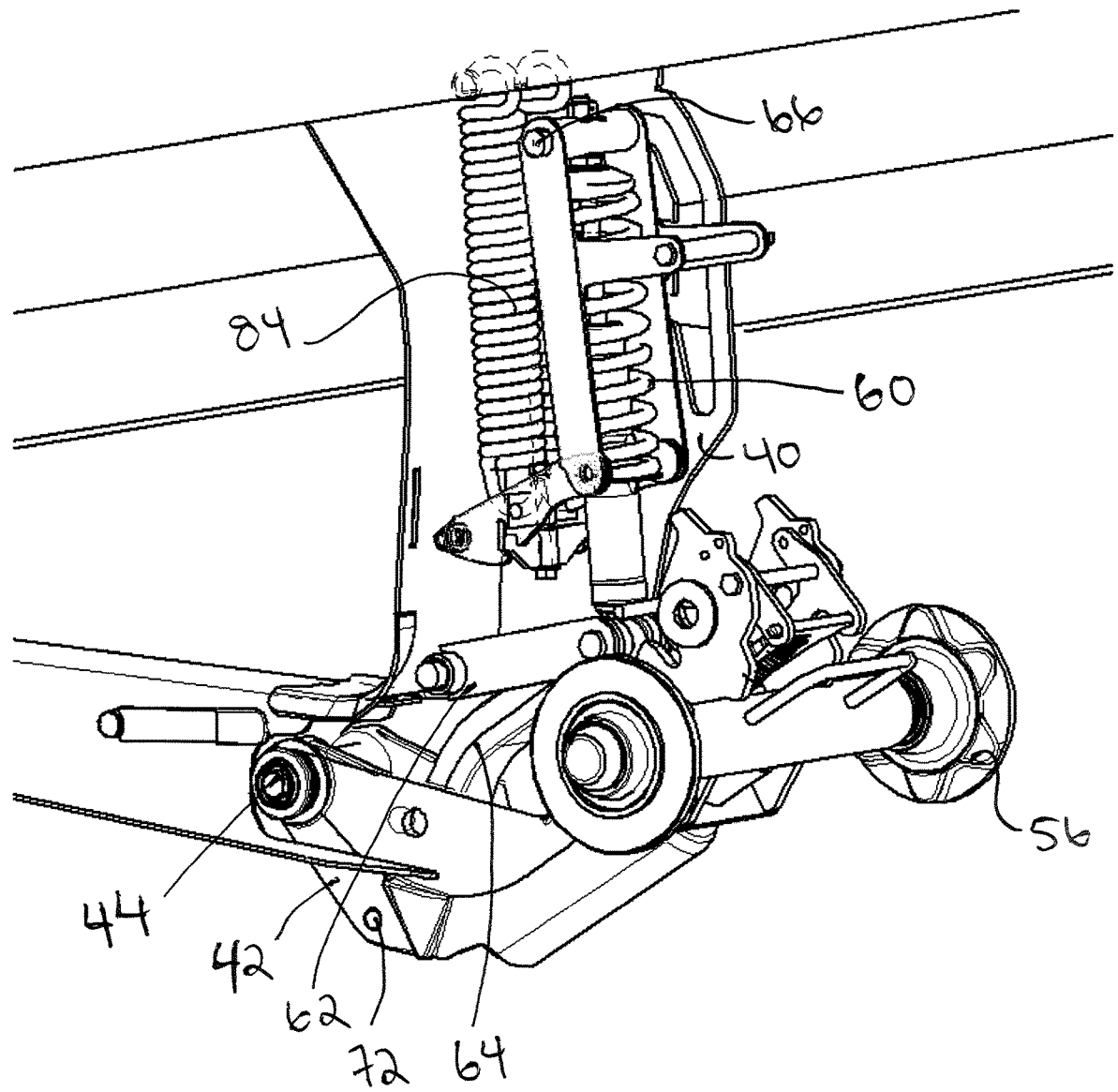
FIG. 8 is an enlarged perspective view of the first wheel arrangement in a second gauge position.

In FIGS. 3 and 4, the header according to the present invention is shown generally which includes the header frame 11 including the frame members 15 previously described. Thus, the frame members include inner frame members 15A and 15B which may be arranged for attachment to the support structure of the transport vehicle. The frame members further include outer frame members 15C and 15D which are arranged to be attached to the ground wheels generally adjacent front and rear ends of the header frame in the transport position respectively.

The first wheel arrangement 26 includes two ground wheels 28. The two ground wheels 28 are connected such that the ground wheels of the first wheel arrangement are pivotal together relative to the header frame about an upright axis in a transport position of the first wheel arrangement between a transport rolling orientation in which the wheel axis of the respective wheels are oriented in the forward working direction of the header frame and a field rolling orientation in which the wheel axis of the respective wheels are oriented transverse to the forward working direction for rolling of the wheel in the forward working direction.

The second wheel arrangement includes a first ground wheel 31 and a second ground wheel 32. The second wheel arrangement 27 further includes a connecting frame 33 extending between the first ground wheel 31 and the second ground wheel 32 such that the first and second ground wheels of the second wheel arrangement are pivotal together relative to the header frame about an upright axis in a transport position of the second wheel arrangement between a transport rolling orientation in which the wheel axis of the respective wheel is oriented in the forward working direction of the header frame and a field rolling orientation in which the wheel axis of the respective wheel is oriented transverse to the forward working direction for rolling of the wheel in the forward working direction.

The connecting frame 33 between the first ground wheel 31 and the second ground wheel 32 of the second wheel arrangement allows the second ground wheel to be raised relative to the first ground wheel in the field rolling orientations so that only the first ground wheel contacts the ground to minimize damage to crops when operating the header in the forward working direction.

Each of the frame members or support arms 15 is generally formed of two side plates 40 oriented generally in the forward working direction of the header so as to be laterally spaced apart from one another and parallel to one another at opposing sides of the support arm. The side plates 40 followed the L-shape of the frame member to include a rear upright portion and a forward protruding portion extending from the bottom of the upright portion. A suitable web is connected between the side plates 40 along the front of the upright portion and the top of the forward protruding portion to form a channel which is generally U-shaped in cross-section and which is open at the rear and bottom thereof.

The first wheel arrangement 26 includes a wheel frame defined by a swing arm 42 which is pivotally coupled at an inner end and a pivot shaft 44 extending laterally between the two side plates at a location in proximity to the rear end of the support arms 15 spaced forwardly of the bottom end of the rear upright portion thereof. The swing arm supports an axle body 46 at the outer end thereof opposite the pivot shaft which in turn supports the pair of ground wheels 28 of the first wheel arrangement rotatably thereon. The swing arm is formed by a pair of side plates 48 which are laterally spaced apart from one another adjacent respective ones of the side plates 40 of the support arm 15. A sleeve 50 is connected between the side plates at the outer end of the swing arm which defines the upright axis about which the ground wheels 28 are pivoted in the transport position between the field rolling orientation and the transport rolling orientation thereof.

The axle body includes a shaft 52 rotatably received within the sleeve 50 of the wheel frame for rotation about the axis defined by the sleeve 50. An axle 54 is supported at the bottom end of the shaft below the swing arm to protrude laterally outwardly from opposing sides of the axle body for mounting the hubs 56 of the two ground wheels 28 rotatably thereon.

The axle body 46 further defines a receiver 57 for a hitch arm 58 that is selectively coupled to the first wheel arrangement 26 as described in further detail below.

The first wheel arrangement 26 has a suspension linkage including a suspension member 60 that is operatively connected between the swing arm and the support arm of the header frame to resiliently suspend the ground wheel 28 relative to the header frame in several operating positions of the first wheel arrangement 26. The suspension linkage further includes a first link 62 formed in two portions at laterally opposing sides of the support arm 15 within the hollow channel of the rear upright portion thereof and a second link 64 formed in two portions at laterally opposing sides of the support arm 15 as well. Each portion of the first link is pivotally supported at a respective side plate 40 for pivotal movement about a common pivot axis of the first link which is located upwardly and rearwardly from the pivot shaft 44 of the swing arm 42. Each portion of the second link 64 is pivotally supported at one end to the corresponding end of a respective portion of the first link 62 and at an opposing end to the swing arm. The first and second links 62 and 64 thus form a 4 bar pivot linkage together with the swing arm and the support arm 15 of the header frame. In this manner the first and second links are pivoted relative to one another as the swing arm pivots relative to the header frame.

The suspension member 60 is pivotally connected at a bottom end on a pivot shaft forming a common pivot axis between the first link 62 and the second link 64 that is parallel to the pivot shaft 44 of the swing arm. The suspension member 60 remains generally upright in orientation throughout the different operating positions of the first wheel assembly to extend upwardly to a top end coupled to a respective pivot shaft 66 extending between the side plates 40 of the support arm 15.

Opposing ends of the pivot shaft 66 at the top end of the suspension member are received within respective slots 68 in the two side plates 40. The pair of slots 68 in the side plates 40 collectively define a track receiving the pivot shaft 66 therein such that the pivot shaft acts as a follower that is displaced along the track formed by the slots 68 to vary an operating position of the suspension linkage and a corresponding elevation of the wheels 28 relative to the header frame.

A biasing linkage as described in further detail below is also provided to assist the operator in manually displacing the first wheel arrangement between the different positions from the transport position, through the gauge positions, to the storage position. The biasing linkage acts against the weight of the ground wheels 28 and the swing arm upon which they are supported to substantially carry the weight thereof as the follower 66 is displaced along the track, removed from the detents 76.

Displacement of the pivot shaft 66 to a bottom end of the track corresponds to a transport position of the first wheel arrangement 26. In the transport position, the upright axis of the axle body 46 relative to the wheel frame is generally vertical in orientation with the axle body being positioned spaced below the header frame forwardly of the rear upright portions of the frame members 15 at the rear side of the header frame. The swing arm 42 in this instance extends generally forwardly and downwardly from the inner end to the outer end thereof which supports the ground wheels 28 thereon.

A suitable latch 70 is pivotally coupled on the support arm 15 at a location spaced forwardly of the swing arm pivot shaft 44 for alignment with a corresponding pin 72 on the swing arm 42 when the first wheel arrangement is in the transport position. When the latch 70 is engaged with the pin 72, the first wheel arrangement is retained in the transport position.

The swing arm includes a pair of protrusions formed at laterally opposing sides thereof which each define a respective load bearing surface 74 on the top side thereof in the transport position which is abutted with the bottom edge of a corresponding side plate 40 of the support arm 15 in the transport position. The load bearing surfaces function both to transfer weight of the header to the wheel frame, axle body and wheels therebelow, while also acting as a stop to prevent pivotal movement of the swing arm beyond the transport position. Engaging the latch 70 with the pin 72 while the load bearing surfaces 74 are abutted with the corresponding surfaces on the header frame thus effectively latches the first wheel assembly in fixed relation to the header frame in the transport position which in turn isolates the suspension member from resiliently suspending the ground wheels 28 relative to the header frame in the transport position. When the latch 70 is released, the follower formed by the pivot shaft 66 at the top of the suspension member can be displaced upwardly along the track.

Figure 10:
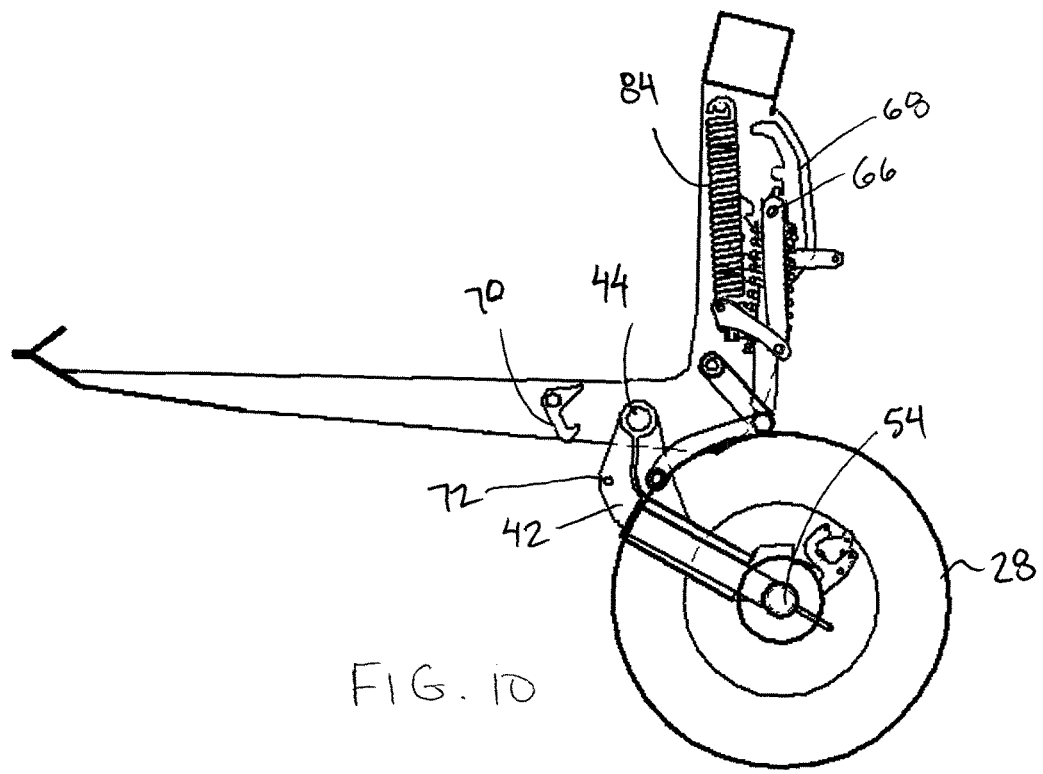
FIG. 10 is a partly sectional side view of the first wheel arrangement in the first gauge position.
Figure 11:
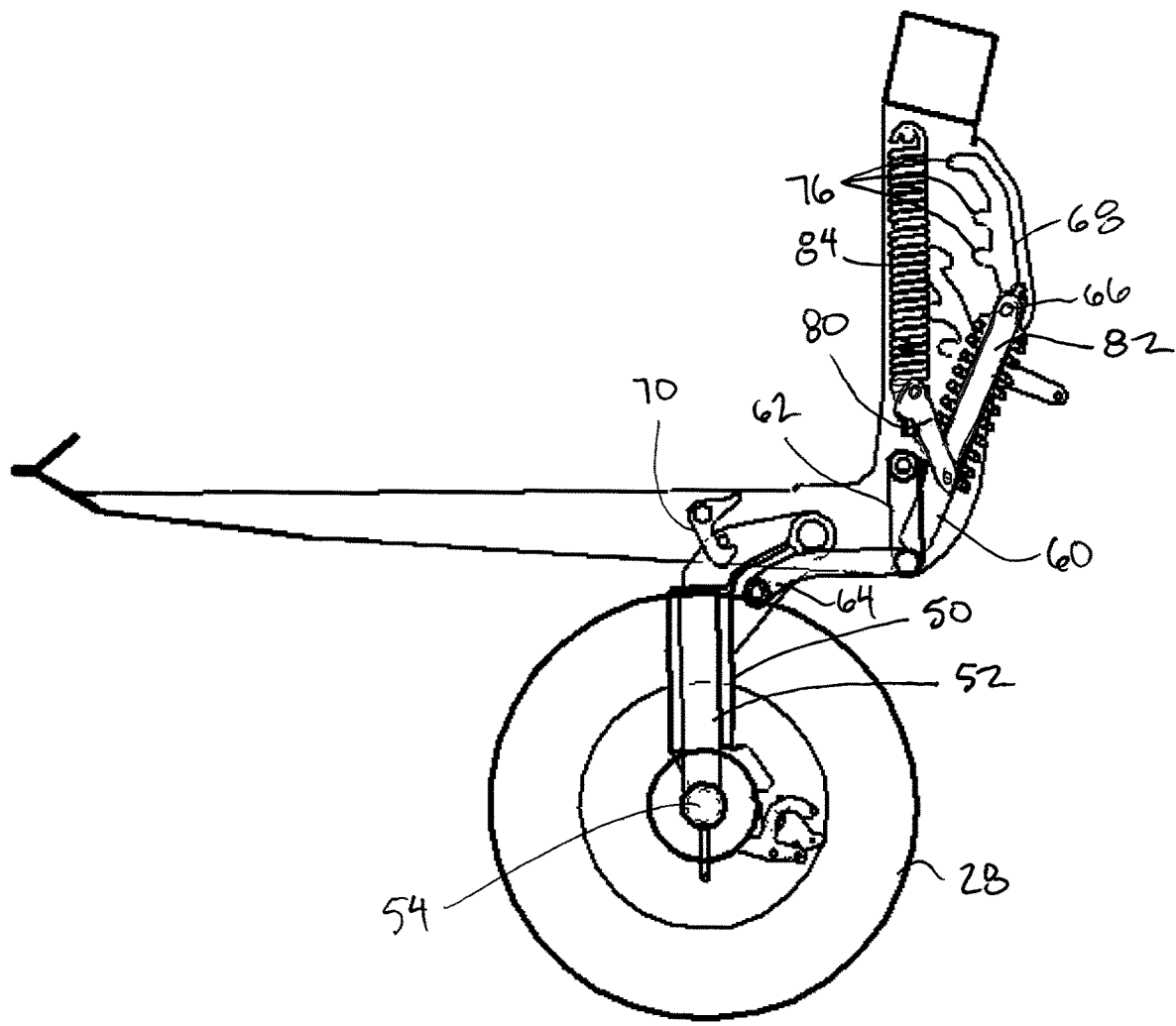
FIG. 11 is a partly sectional side view of the first wheel arrangement in the transport position with the wheels oriented in the field rolling orientation.
Figure 12:
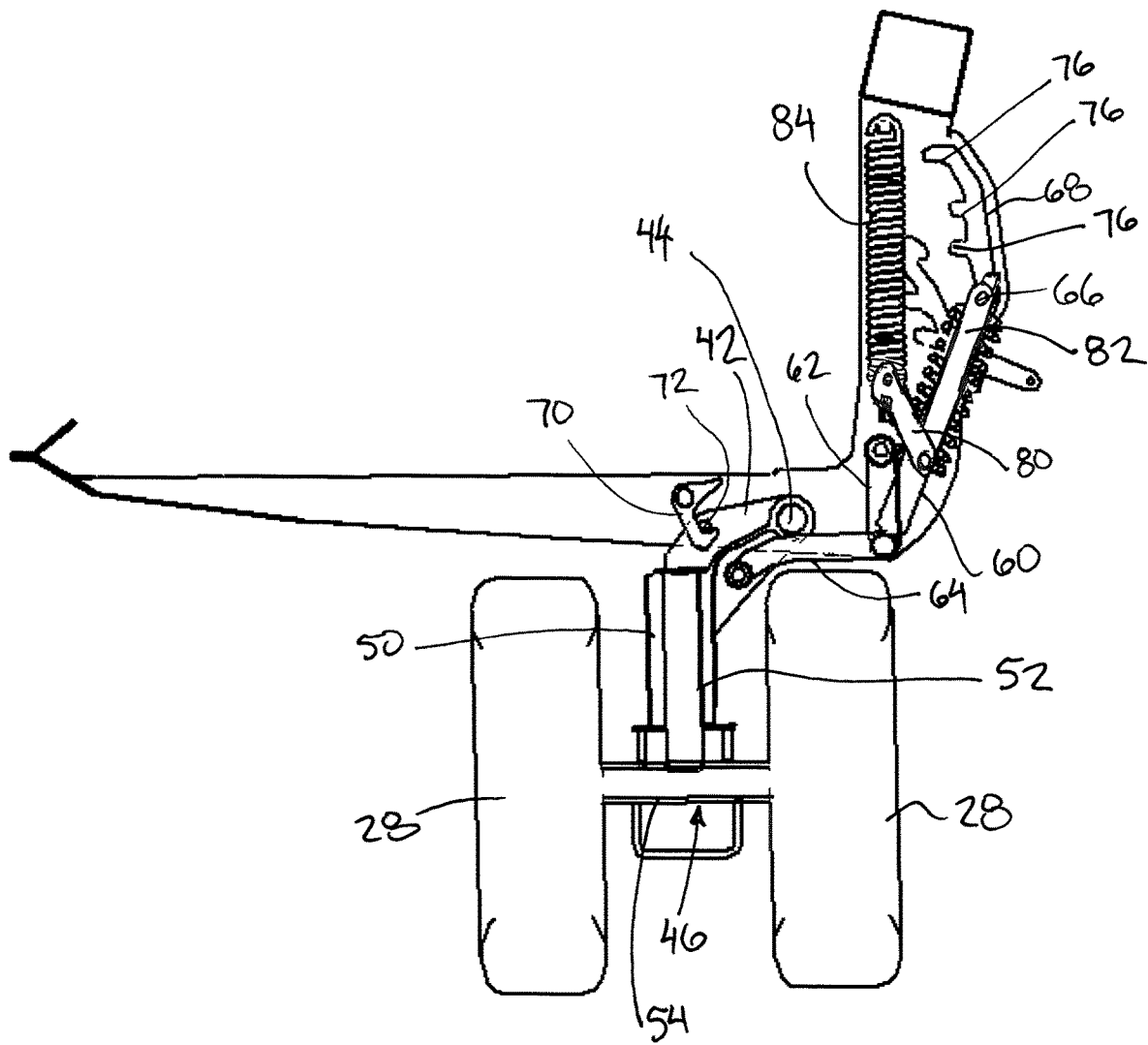
FIG. 12 is a partly sectional side view of the first wheel arrangement in the transport position with the wheels oriented in the transport rolling orientation.
Figure 13:
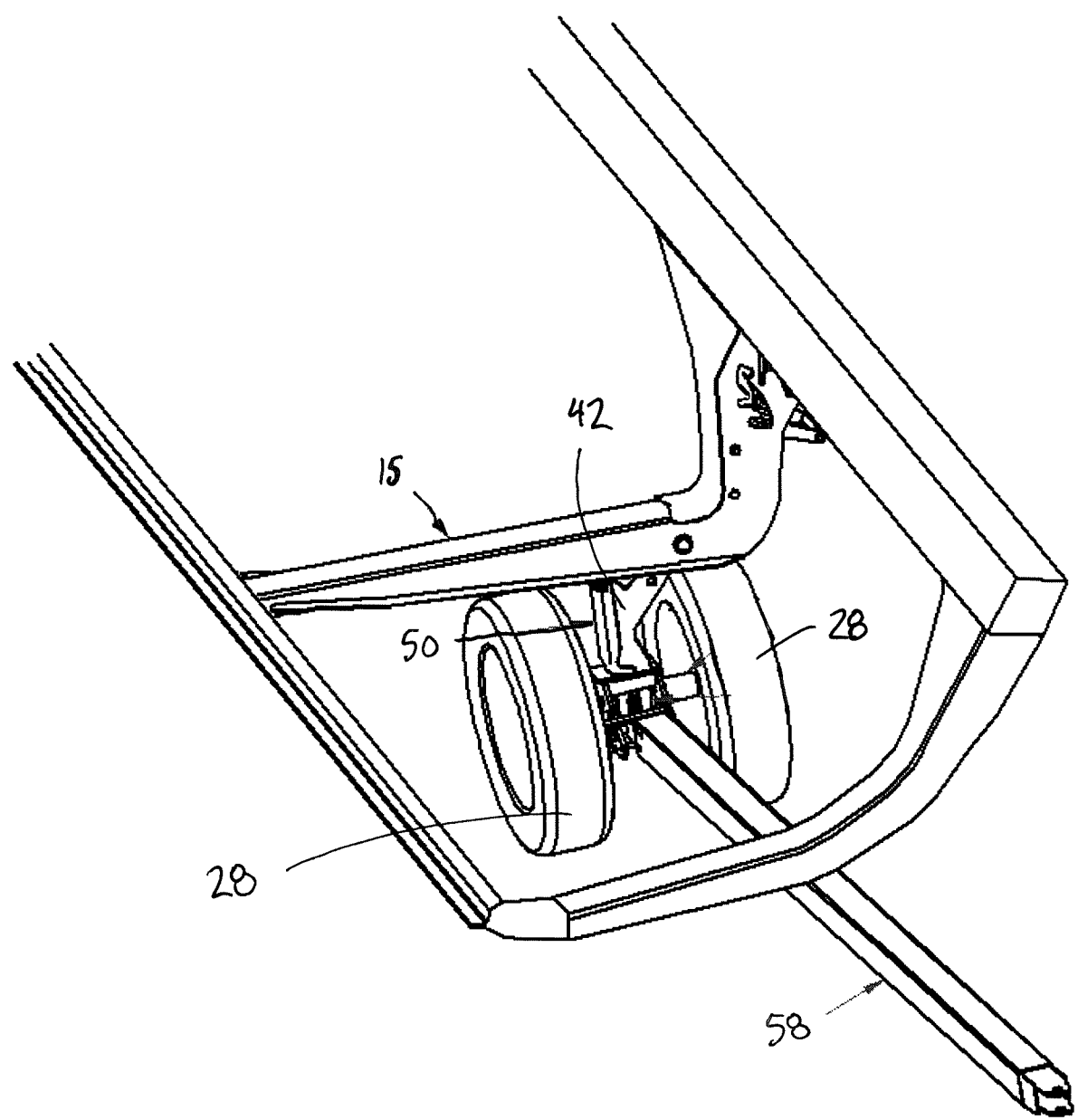
FIG. 13 is a perspective view of the first wheel arrangement in the transport position in connection with a hitch arm.

A pair of detents 76 are provided at different elevations along the track in which each detent is a forward protruding recess formed relative to the slots 68 to enable the follower 66 of the suspension linkage to be received therein within a respective pair of gauge positions. A lowermost one of the gauge positions is shown in FIG. 10, however in each of the gauge positions the swing arm is oriented to extend generally downwardly and rearwardly from the pivot shaft 44 at the inner end thereof to the axle body supporting the wheels 28 at the outer end thereof. Furthermore, in each of the gauge positions, the detents receive the pivot shaft 66 therein to function as stops which restrict further upward and downward movement of the top end of the suspension member relative to the header frame. Once received in a detent, the biasing linkage is locked and the suspension linkage cannot be changed to a different operating position, however, the suspension member can still resiliently change in length so that the wheels 28 are resiliently suspended in elevation relative to the header frame in each of the gauge positions by the suspension member.

The suspension member 60 generally comprises a fluid damper member in combination with a coil spring for bearing weight thereon while the fluid damper dampens oscillations of the spring as the overall suspension member linearly varies in length between the opposed top and bottom ends thereof in the usual manner of a fluid and spring combination suspension member.

Figure 9:
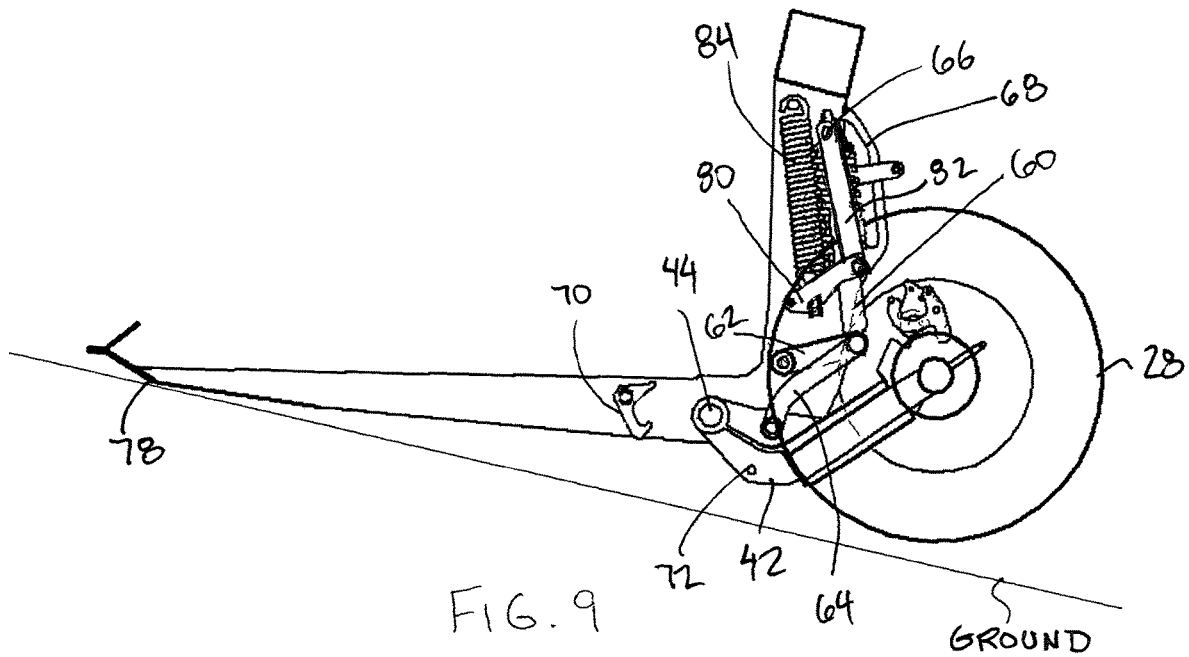
FIG. 9 is a partly sectional side view of the first wheel arrangement in the storage position.

The pivot shaft 66 at the top end of the suspension member 60 can also be displaced rearwardly from either of the intermediate detents of the gauge positions so that the follower can be moved further upwardly along the track to the top end of the track corresponding to a storage position as shown in FIG. 9. A further forward protruding detent 76 is provided at the top end of the track to receive the pivot shaft 66 therein in the storage position. When the top end of the suspension member is positioned in the storage position relative to the header frame, the swing arm extends generally upwardly and rearwardly from the inner end to the outer end thereof such that the ground wheels 28 are supported at their uppermost elevation substantially out of use.

The header is provided with other ground engaging surfaces 78, for example a skid in close proximity immediately below the cutter bar along the front end of the header which is intended to ride along the ground in the lowermost cutting position of the header. In the lowermost cutting position of the header with the ground engaging surface 78 intended to engage the ground, the wheels 28 of the first wheel arrangement are supported at an elevation which is substantially at or spaced above the elevation of the ground engaging surfaces 78 so that the wheels 28 are not engaged with the ground and/or do not carry any weight of the header thereon.

Similarly to the suspension linkage, the biasing linkage also includes two portions formed at opposing sides of the support arm 26 by being mounted on the opposing side plates 40 of the support arm. The biasing linkage includes a first link 80 having two portions pivoted at respective forward ends on the two side plates 40 about a common axis which is located generally forwardly of the suspension member 60. The first link 80 extends generally rearwardly to an opposing rear end which is typically located rearwardly of the suspension member. A second link 82, formed in two portions at laterally opposing sides of the suspension member, is pivotally coupled at the rear of the first link 80 at one end and is pivotally coupled to the pivot shaft 66 at the top end of the suspension member 60 at the other end thereof.

A pair of biasing springs 84 of the biasing linkage are also received within the upright portion of the support arm 15 to extend approximately alongside the suspension member 60 at a location forwardly thereof. The top ends of the biasing springs 84 are fixed onto the header frame at a location spaced slightly forward of the top end of the track 68. The bottom ends of the pair of biasing springs 84 are anchored onto a crossbar connected between the two portions of the first link 80 at an intermediate location between the pivotal connection of the first link 80 to the header frame and the pivotal connection of the first link to the second link 82.

The biasing springs act on the first links 80 to cause a rotation of the first links which urges the second links 82 upwardly which in turn urges the follower formed by the pivot shaft 66 at the top end of the suspension member 60 upwardly from the transport position at the bottom of the track to the storage position at the top of the track.

Due to the first link 80 having a rear end which is rearward of the suspension member, the upward force acting on the follower as a result of the biasing springs 84 tends to be oriented transversely to the suspension member and transversely to the track in a manner that urges the follower both upwardly and slightly forwardly in the direction of the detents from the track. In this manner the follower is biased forwardly into each of the detents 76 along the track in a manner which tends to retain the follower within the selected detent receiving the follower therein which in turn retains the suspension linkage at the selected operating position thereof.

The biasing linkage provides biasing force which urges the follower upwardly along the track, however once the follower has been displaced into any of the detents, the detents are oriented transversely to the track in a manner which prevents the biasing member from further acting on the suspension linkage so that the detents act as stops which lock and isolate the biasing springs 84 from the suspension linkage in each selected position of the suspension linkage.

The depth of the detents from the track may be greater than the amount of displacement required to displace the linkage over centre when the second links are oriented in close proximity alongside the suspension member such that displacing the follower 66 within each detent rearwardly to the track portion of the slots 68 may be sufficient to remove some of the forward bias such that it is easier to retain the follower for movement along the track against the biasing once the follower has been removed from one of the detents.

Within each of the gauge positions, the detents prevent the biasing springs from acting on the suspension linkage, however the swing arm is still free to undergo some deflection and change in elevation relative to the header frame as the suspension member 60 resiliently deforms linearly in length.

The receiver 57 of the first wheel arrangement 26 is arranged for mating connection with a mounting portion 86 at a trailing end of the hitch arm adapted for connection to the header. The hitch arm is an elongated rigid tube having a conventional hitch connection at the opposing leading end which is suitable for connection to a suitable tow vehicle in the transport position of the header. The mounting portion 86 of the hitch arm 58 comprises a crossbar 88 oriented perpendicularly to the longitudinal direction of the hitch arm at a location spaced from the end of the rigid tube by an end portion 90 of the hitch arm which is reduced in lateral dimension relative to the rigid tube portion. The crossbar 88 is wider in the lateral direction than the end portion 90 such that the crossbar protrudes laterally outward at both opposing sides relative to the end portion 90 of the hitch arm upon which they are supported.

The receiver 57 generally includes two side plates 92 which are laterally spaced apart by a suitable width to receive the end portion of the hitch arm therebetween while being narrower in width than the overall width of the crossbar 88 in the lateral direction. In this manner, the protruding opposing ends of the crossbar can be coupled to the two side plates 92 respectively in a hitched position of the hitch arm mated with the receiver.

The two side plates include leading edges 94 which are ramped upwardly and inwardly towards the axle body when the first wheel arrangement is oriented in the transport position. A receiver opening 96 is formed in each side plate 92 to be similar in shape with one another having a mouth that is open at the leading edges 94 above the ramped portion thereof. The receiver openings 96 are each recessed downwardly from the mouth to define a cradle portion 98 suitably sized for receiving respective ones of the ends of the crossbar 88 therein. The leading boundary of each cradle portion is generally upright in orientation to define a suitable load bearing surface against which pulling forces on the hitch arm can be transferred to the header for towing of the header with the hitch arm.

A suitable latch assembly is provided comprised of two latch members 100 pivotally supported on respective ones of the side plates 92 of the receiver to be operated together for defining a single latch collectively retaining the hitch arm mated with the receiver 57 in a hitched position. Each of the latch members is generally C-shaped having a lower portion coupled to the respective side plate by a suitable pivot coupling 102 at a location below and forwardly of the respective cradle portion 98. Each latch member extends rearwardly from the pivot coupling, then upwardly and forwardly over top of the cradle portion for hooking over top of a respective end of the crossbar 88 received within the respective cradle portion 98 in the hitched position. A connecting bar 104 is connected between the upper free ends of the two latch members.

Figure 14:
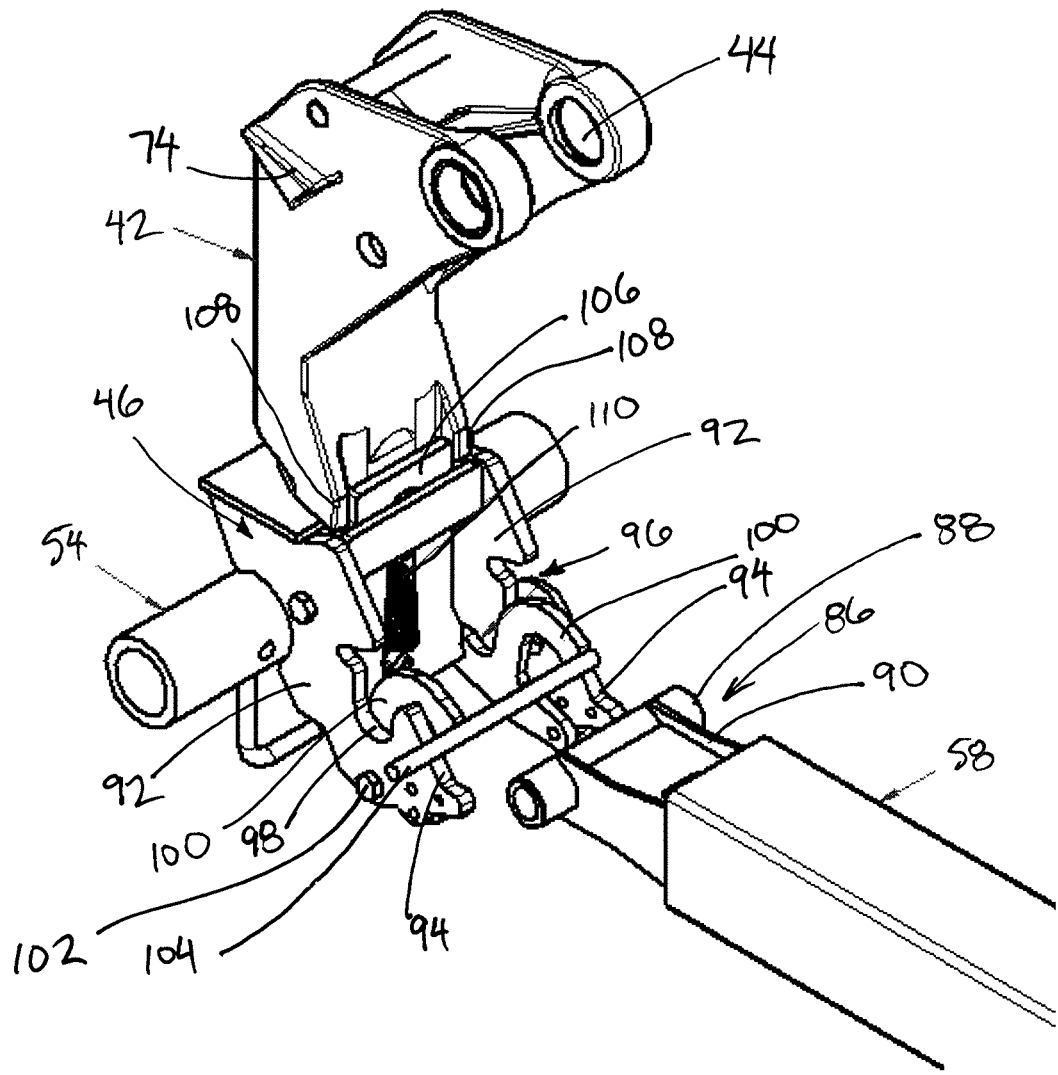
FIG. 14 is a perspective view of the wheel frame of the first wheel arrangement in and unhitched position of the hitch arm shown separated from the wheel frame and with the anti-rotation member in a locked position.

When the hitch arm is separated from the receiver 57, the latch assembly can be positioned in unhitched position as shown in FIG. 14 in which the connecting bar 104 abuts the front ramped edges 94 of the receiver with the latch members being pivoted to their most forward position in overlapping arrangement with the cradle portion 98 so that the crossbar 88 of the hitch arm cannot be received within the cradle portions. Furthermore in the unhitched position, the latch members extend across and close the mouths of each receiver opening 96.

At the opposing end of the range of movement of the latch members from the unhitched position of FIG. 14, the upper ends of the latch members can be pivoted to their rearmost position so that the mouths of the receiver openings 96 are fully accessible to permit insertion of the crossbar 88 into the respective cradle portions 98 of the receiver. The connecting bar 104 extending laterally between the top ends of the latch members 100 can be automatically deflected upwardly and away from the ramped front edges 94 of the receiver simply by pushing the opposing ends of the crossbar 88 upwardly along the ramped edges. The crossbar 88 of the hitch arm will engage the connecting bar 104 of the latch to displace the latch up and away from the unhitched position, through the hitched position, until the open position is reached at which point the opposing ends of the crossbar can be inserted into the mouth of the receiver openings and dropped downwardly into the respective cradle portions 98 thereof.

Figure 17A:
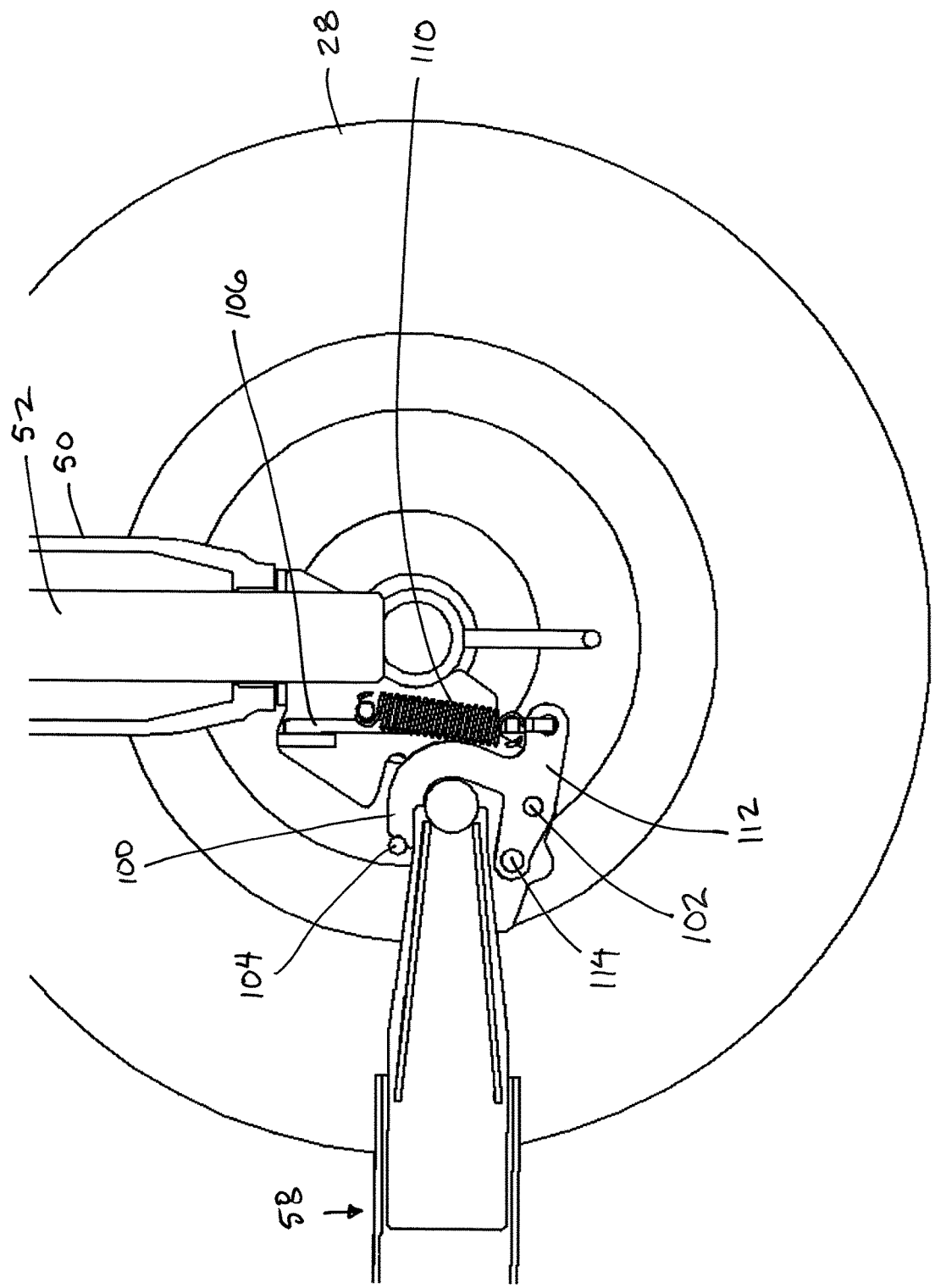
FIG. 17A is a sectional view of the wheel frame of the first wheel arrangement in the unlocked position of the anti-rotation member as a result of the latch being in the latch position with the hitch arm retained within the receiver.
Figure 18:
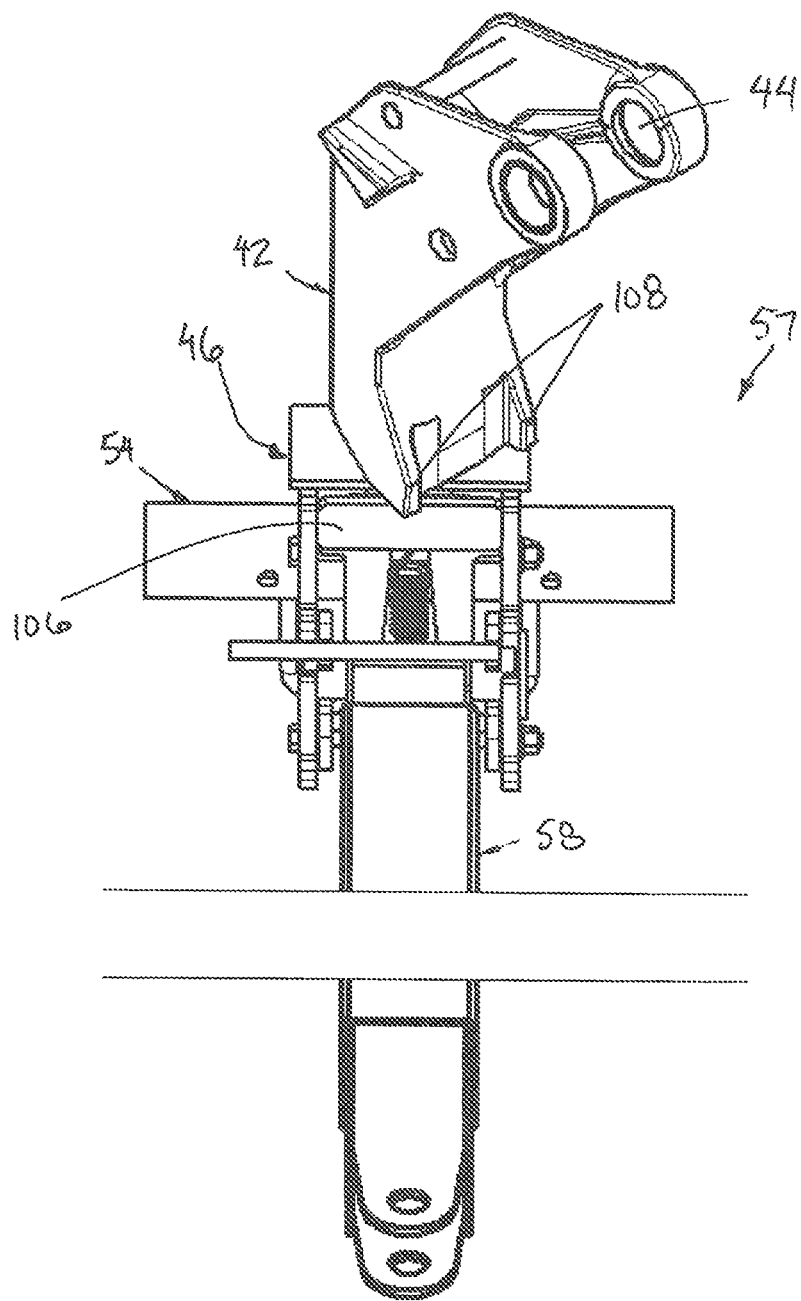
FIG. 18 is a perspective view of the real frame of the first wheel arrangement with the hitch arm and wheels being rotated partway towards the transport rolling orientation relative to the wheel frame.

Once the crossbar 88 of the hitch arm has been fully inserted into the cradle portions 98 of the receiver, the latch members 100 can be pivoted partway from the fully open position towards the unhitched position of FIG. 14 to locate the latch members in the hitched position of FIG. 17 A. In this instance, the top ends of the latch members 100 are displaced sufficiently forwardly from the fully open position of FIG. 17B that the latch members extend across the mouths of the receiver openings 96 to latch and retain the crossbar 88 within the cradle portions 98.

The latch assembly is linked to an anti-rotation member 106 which selectively locks the rotation of the axle body 46 of the first wheel arrangement 26 relative to the wheel frame 42 to selectively lock the ground wheels 28 in the field rolling orientation. The latch assembly is linked to the anti-rotation member 106 in a manner so as to act as an actuator for actuating the locking and unlocking of the member 106 according to the condition of the latch assembly and the condition of the hitch arm being hitched relative to the receiver 57.

The anti-rotation member 106 is a rigid plate which is mounted for sliding movement between the side plates of the receiver 57 so as to be perpendicular to the side plates and parallel to the upright pivot axis of the axle body relative to the wheel frame in the transport position thereof. Specifically the anti-rotation member 106 is longitudinally slidable between an unlocked position in which the top edge of the plate is situated below the bottom edge of the sleeve 50 of the wheel frame so as not to interfere with rotation of the axle body relative to the wheel frame, and a locked position in which the top edge of the plate protrudes upwardly from the receiver 57 to overlap the rear face of the sleeve 50 of the wheel frame in the axial direction thereof. A pair of stops 108 are formed on the rear face of the wheel frame for abutment with the opposing side edges of the plate defining the anti-rotation member in the locked position thereof, however, when the plate is displaced to the unlocked position, the top edge of the plate is located below the stops such that there is no interference with the relative rotation between the axle body and the wheel frame. When the rotation of the ground wheels relative to the wheel frame is locked by the anti-rotation member 106, the wheels are retained in the field rolling orientation.

A biasing spring 110 is operatively connected between the anti-rotation member 106 and the axle body in a manner which biases the sliding movement of the anti-rotation member upwardly from the unlocked position to the locked position thereof.

The latch members of the latch assembly include respective leg members 112 extending inwardly from the bottom end of the latch member towards the anti-rotation member for pivotal connection at opposing sides of the bottom end of the anti-rotation member. In this manner, the latch members are pivoted together from the open position through the hitched position to the unhitched position together with sliding movement of the anti-rotation member from the unlocked position to the locked position thereof. In this manner, the upward biasing provided by the spring 110 acting to urge the anti-rotation member toward the locked position thereof also acts to bias the pivoting of the latch members in a common pivoting direction from the open position to the hitched position, and through the hitched position to the unhitched position thereof.

A pin aperture 114 is provided on the latch members for selective alignment with corresponding apertures on the side plates 92 to pin the latch members in a selected orientation if desired.

Figure 15:
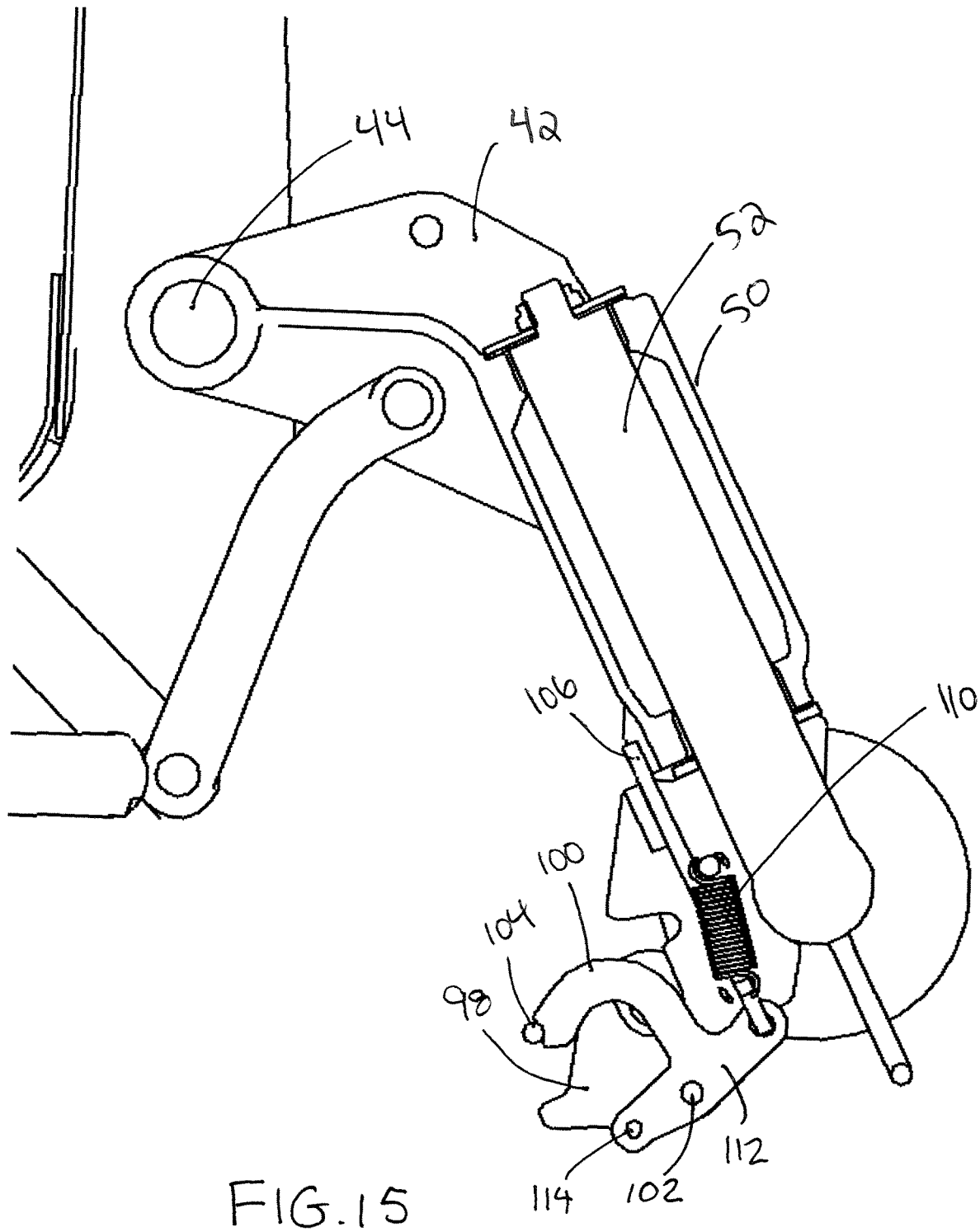
FIG. 15 is a sectional view of the wheel frame of the first wheel arrangement in the locked position of the anti-rotation member.
Figure 16:
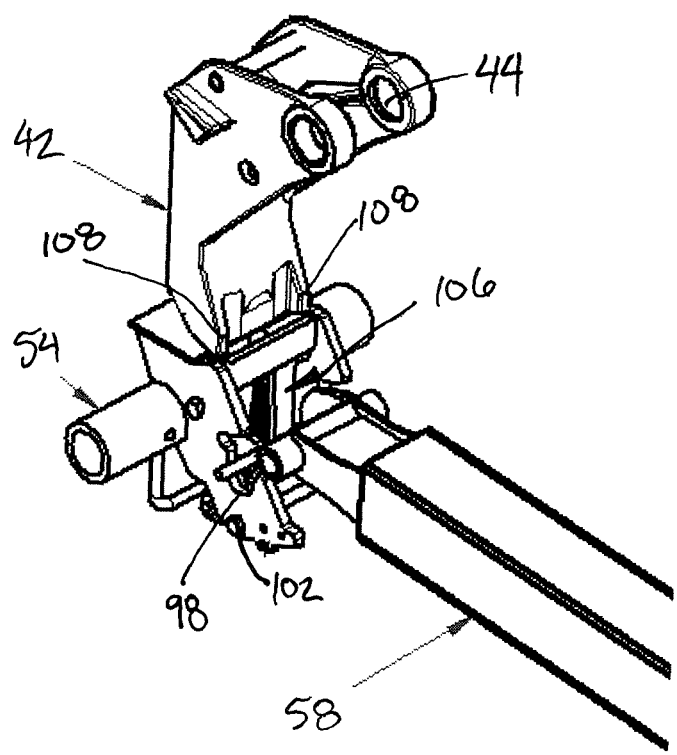
FIG. 16 is a perspective view of the wheel frame of the first wheel arrangement in which the anti-rotation member is in an unlocked position due to displacement of the latch partway towards the open position for receiving the hitch arm therein.

With the latch assembly initially positioned in the unhitched position of FIG. 15 with the hitch arm separated from the receiver, an operator can initially displace the hitch arm towards the receiver such that the crossbar rides up the ramped edges of the receiver plates to automatically displace the top ends of the latch members from the unhitched position through to the open position thereof by the abutment of the crossbar 88 with the connecting bar 104 at the top end of the latch members. Once the open position is reached, the crossbar of the hitch arm can be dropped downwardly into the cradle portion 98 of the receiver openings 96 and the latch members will automatically be returned from the open position to the hitched position under action of the biasing of the spring 110. In the hitched position, the connection of the latch members to the anti-rotation member will cause the anti-rotation member to be retained in the unlocked position so that the ground wheels 28 of the first wheel arrangement are freely pivotal together with the hitch arm from the field rolling orientation to the transport rolling orientation.

When releasing the hitch arm, the gauge wheels are typically initially rotated back from the transport rolling orientation to the field rolling orientation. Releasing of the hitch arm requires that an operator manually grasp the connecting bar 104 to manually displace the latch members against the biasing of the spring 110 from the hitched position to the open position. In the open position, the hitch arm can be displaced upwardly and outwardly from the receiver openings of the receiver for separation of the hitch arm from the receiver. Upon separation, when the operator manually releases the connecting bar 104, the biasing of the spring 110 will automatically return the latch to the unhitched position which in turn allows the anti-rotation member to automatically return to the locked position to retain the ground wheels 28 locked in the field rolling orientation relative to the wheel frame.

Turning now to the second wheel arrangement 27, the second wheel arrangement comprises a resiliently suspended wheel arrangement similarly to the first wheel arrangement 26. In the second wheel arrangement, the wheel frame again comprises a swing arm 120 which is pivotally supported at an inner end between the side plates 40 of the support arm 15 of the header frame at a location adjacent the rear of the header but spaced slightly forwardly of the bottom end of the upright leg portion of the support arm 15. The swing arm 120 is pivotally coupled on a pivot shaft 122 at the forward end thereof which extends laterally between the side plates 40. The swing arm 120 extends generally rearward to an opposing outer end of the swing arm.

The swing arm 120 comprises two side plates 126 formed at opposing sides of the swing arm in proximity to the side plates 40 of the frame member 15 within which the swing arm is received. At the outer end of the swing arm 120, a shaft 124 is fixedly mounted between the two side plates 126 for supporting an axle body 128 on the shaft so that the axle body is rotatable about an upright axis relative to the swing arm of the wheel frame in a transport position. The axle body 128 supports a first axle thereon which rotatably supports the hub of a first ground wheel 31 of the second wheel arrangement thereon. The first wheel is rotatable about a respective wheel axis relative to the axle body in which the wheel axis is oriented perpendicularly to the pivot axis of the axle body relative to the wheel frame.

The second wheel arrangement further comprises a connecting frame 130 extending generally in the direction of the first wheel axis from the first wheel to the opposing second wheel 32 of the second wheel arrangement. The connecting frame 130 includes a crossbar which is pivotally connected to the axle body at a first end thereof for relative pivotal movement about a pivot axis which is oriented perpendicularly to the first wheel axis to remain substantially parallel to the rolling direction of the first wheel as the first wheel changes in orientation relative to the wheel frame by pivoting of the axle body relative to the wheel frame. An opposing second end of the connecting frame supports a second axle thereon which rotatably receives the hub of the second wheel 32 thereon for rotation of the second wheel about a respective second wheel axis. The orientation of the second wheel axis relative to the connecting frame 130 remains fixed.

As the connecting frame 130 pivots together with the axle body relative to the wheel frame of the second wheel arrangement, both the first and second wheels 31 and 32 of the second wheel arrangement 27 are pivoted together between the field rolling orientation and the transport rolling orientation.

In the field rolling orientation, the second end of the connecting frame 130 supporting the second wheel thereon is supported by a field mounting arrangement 132 relative to the header such that the first and second wheels 31 and 32 are spaced apart along the width of the header at the rear of the header. The first and second wheels are both oriented for rolling movement in the forward working direction of the header but with the second wheel 32 being spaced above the first wheel in elevation so as to be spaced above the ground in a non-contacting relation with the ground even when the first wheel 31 is engaged for rolling movement along the ground while supporting the header thereon. The field mounting arrangement 132 is described in further detail below.

In the transport rolling orientation, the second end of the connecting frame 130 supporting the second wheel thereon is supported by a transport mounting arrangement 134 relative to the header such that the first and second wheels 31 and 32 are supported in proximity to the rear side of the header frame and the cutter bar at the front side of the header frame respectively for rolling movement perpendicularly to the forward working direction of the header. Both the first and second wheel 31 and 32 are engaged for rolling movement along the ground to support the header thereon by the transport mounting arrangement. The transport mounting arrangement 134 is described in further detail below.

The second wheel arrangement 27 also includes a suspension linkage including a suspension member 136 which is substantially identical to the suspension member 60. The bottom end of the suspension member 136 is pivotally connected on a pivot shaft 138 which is connected laterally between opposing sides of the swing arm 120 of the second wheel arrangement. The opposing top end of the suspension member 136 is pivotally coupled on a pivot shaft 140 which is coupled between the side plates 40 of the frame member so as to similarly act as a follower which can be displaced along a track 142 formed by slots within the two side plates 40 respectively. The suspension member remains generally upright in orientation as the follower is displaced along the track upwardly and downwardly relative to the header frame for varying the elevation of the first wheel 31 of the second wheel arrangement.

When the follower 140 corresponding to the top end of the suspension member is positioned at the bottom end of the slots corresponding to the bottom end of the track, the second wheel arrangement is located in a transport position or second gauge position dependent upon the orientation of the wheel. A forward detent 144 extends forwardly from the bottom end of the track 142 similarly to the detents 76 to selectively retain the suspension member in the transport position. In the transport position the swing arm extends generally downwardly and rearwardly from the inner end pivotally coupled to the frame member 15 to the outer end supporting the axle body and the first wheel 31 thereon. In the transport position the axle body is pivotal about a vertical axis relative to the swing arm defining the wheel frame of the second wheel arrangement between the field rolling orientation and a transport rolling orientation of the first wheel to determine whether the second wheel arrangement is in the second gauge position or the transport position.

Moving the follower 140 upwardly along the track to another detent 144 at an intermediate location along the length of the track results in the suspension member being displaced to a first gauge position of the second wheel arrangement in which the outer end of the swing arm and the first wheel supported thereon is displaced upwardly relative to the second gauge position. In either gauge position, the follower is received within a detent which functions as a stop to prevent further adjustment of the suspension linkage; however the suspension member can still be resiliently deformed in length such that the first wheel 31 of the second wheel arrangement is resiliently suspended relative to the header frame by the suspension member in each gauge position.

Removing the follower from the intermediate detent 144 allows the follower to be displaced further upwardly to the top of the track. At the top of the track, an additional detent 144 is provided in the track which extends rearwardly and which receives the follower therein in the storage position of the second wheel arrangement. Similarly to the first wheel arrangement, the swing arm 120 of the second wheel arrangement extends generally upwardly and rearwardly from the pivot shaft 122 at the inner end to the axle body supporting the first wheel 31 at the outer end thereof so that the first wheel 31 is supported upwardly and out of use above the elevation of the ground engaging surfaces of the header.

The second wheel arrangement 27 also includes a biasing linkage 146. Similarly to the biasing linkage of the first wheel arrangement, the biasing linkage 146 provides a spring biasing force which acts against the weight of the first ground wheel of the second wheel arrangement as it is displaced in elevation along the track between the different operating positions of the suspension linkage. The biasing linkage 146 includes a first link 148 formed in two portions at laterally opposing sides of the frame member 15 for connection to the two side plates 40 respectively. The two portions of the first link are pivotally connected to the side plates 40 at a location forwardly of the suspension member in close proximity to the pivot shaft 122 of the swing arm.

The first link 148 extends generally rearward to a rear end which is positioned rearwardly of the suspension member similarly to the first wheel arrangement. The biasing linkage also includes a second link 150 also formed in two portions at the two sides of the frame member 15 respectively. The second link 150 extends alongside the suspension member 136 such that the two portions of the second link are provided at laterally opposing sides of the suspension member received therebetween. The two portions of the second link 150 are pivoted at one end to the rear end of the respective two portions of the first link 148 while being pivoted at the opposing end to the pivot shaft 140 at the top end of the suspension member 136.

A pair of biasing springs 152 of the biasing linkage 146 are supported within the hollow forward projecting portion of the frame member 15 to extend generally in the forward working direction of the header. The springs are fixed at the forward ends thereof relative to the header frame and are connected at the rear ends thereof onto respective crank arms 154 on the two portions of the first link 148. The crank arms protrude upwardly from the pivotal connection of the first links to the frame member 15 such that the forward biasing provided by the springs 152 acts to urge rotation of the first link in a direction that biases the second link 150 connected at the rear end of the first link upwardly.

Similarly to the first wheel arrangement, the upward biasing provided by the springs 152 acting on the follower is oriented transversely to the track and the linear direction of the suspension member such that the biasing force applied to the follower within the detents in each of the first and second gauge positions is both upward and forwardly in the direction of the detents to retain the follower within the corresponding detent. When the follower is displaced rearwardly to remove the follower from the respective detent and return the follower to the track, the biasing linkage is rotated nearly over centre or to a more neutral position so that the upward biasing force is nearly aligned with the track as the follower follows along the track towards the upper detent. When the follower reaches the top of the track and is displaced rearwardly into the detent 144 corresponding to the storage position, the biasing linkage is rotated over centre such that the springs instead apply an upward and rearward biasing force to the follower, again acting to urge the following in the direction of the detent and retain the follower within the detent, thus retaining the suspension linkage at the selected operating position without any pins being required.

As in the first wheel arrangement, the biasing of the second wheel arrangement carries the weight of the wheel by countering the downward gravity forces acting on the follower from the weight of the first wheel 31 and the swing arm as the follower travels along the upright track portion of the slots. When the follower is displaced transversely to the track into one of the detents, the detents function as stops which restrict further upward and downward movement of the follower which in turn locks the top end of the suspension member 136 in fixed relation relative to the header frame so that the biasing springs 152 are prevented from further acting on the suspension linkage in the selected operating position.

Figure 20:
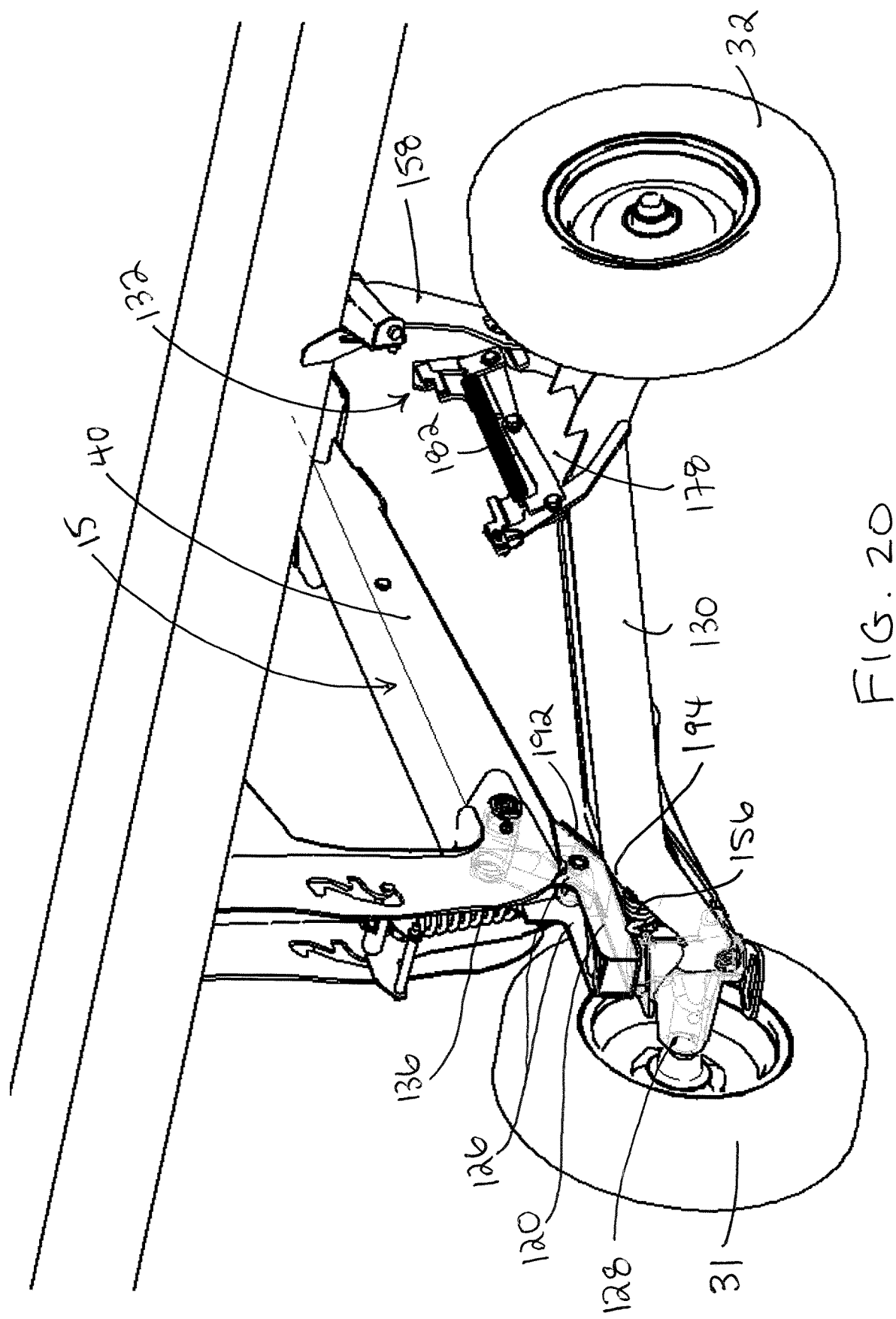
FIG. 20 is a perspective view of the second wheel arrangement in the field working position.
Figure 21:
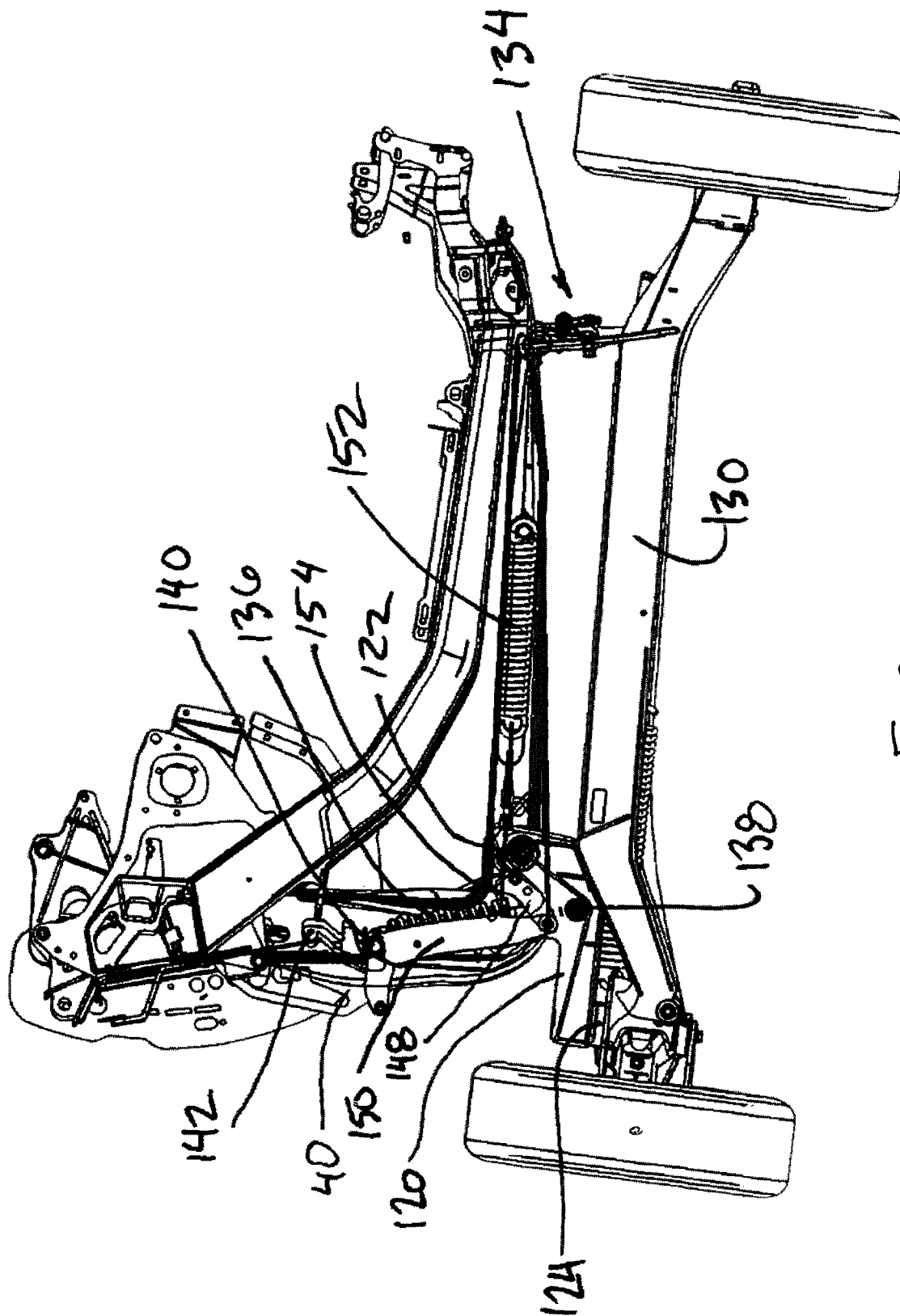
FIG. 21 is a partly sectional side view of the second wheel arrangement in the transport position in which the wheels are oriented for rolling in the transport rolling orientation.
Figure 22:
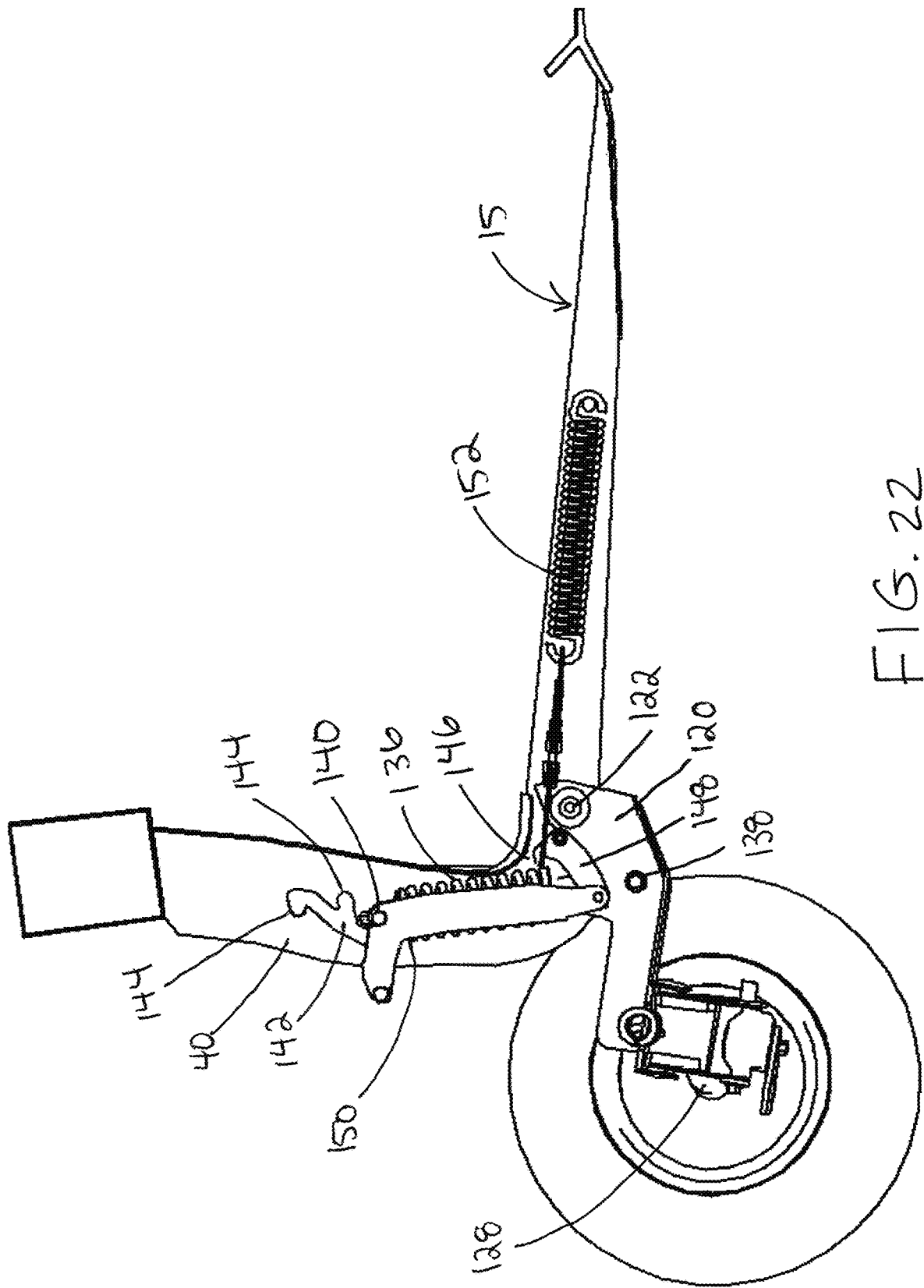
FIG. 22 is a partly sectional side view of the second wheel arrangement in a first gauge position in which the wheels are oriented for rolling in the field rolling orientation.
Figure 23:
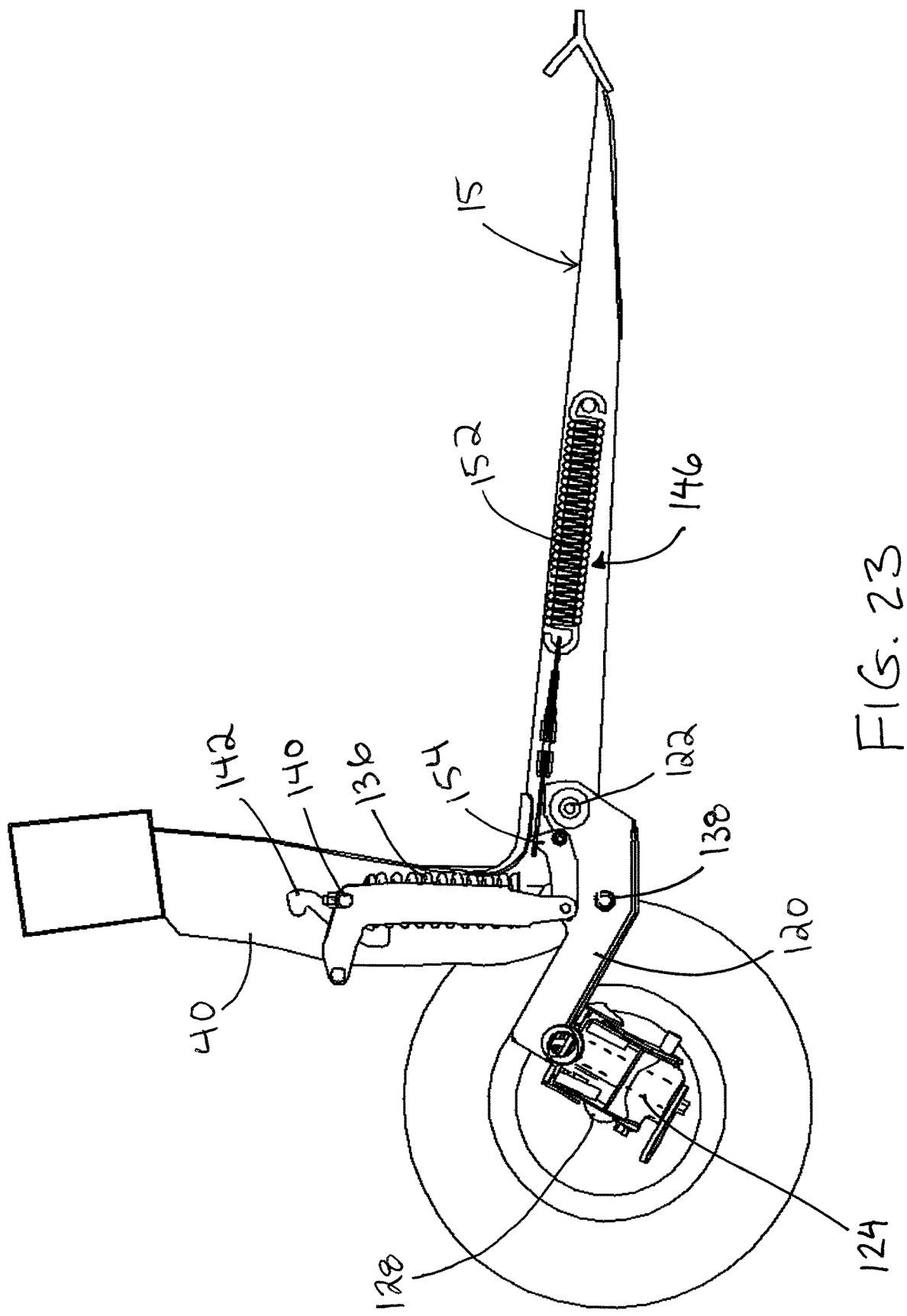
FIG. 23 is a partly sectional side view of the second wheel arrangement in a second gauge position.
Figure 24:
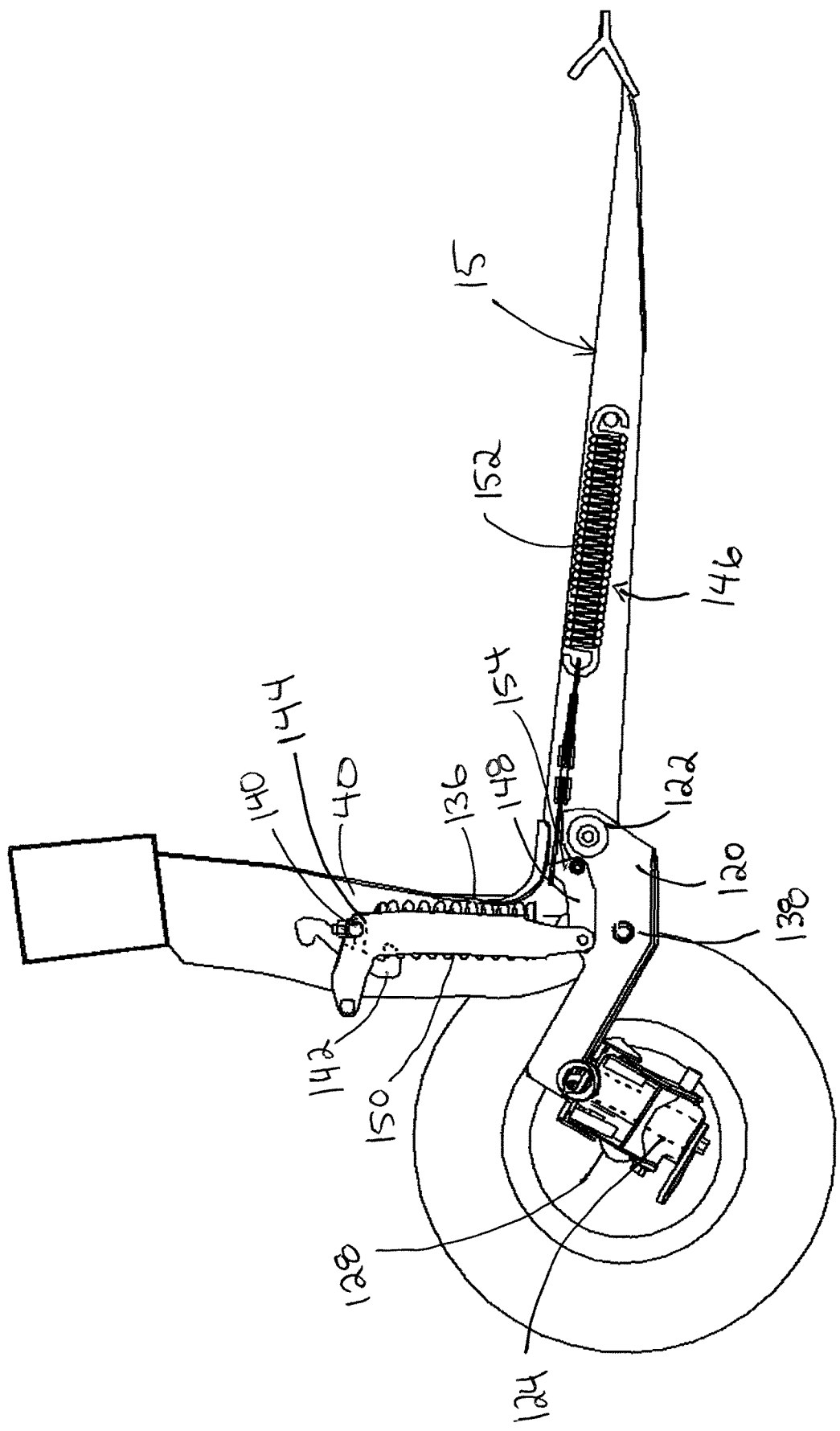
FIG. 24 is a partly sectional side view of the second wheel arrangement in a storage position.
Figure 25:
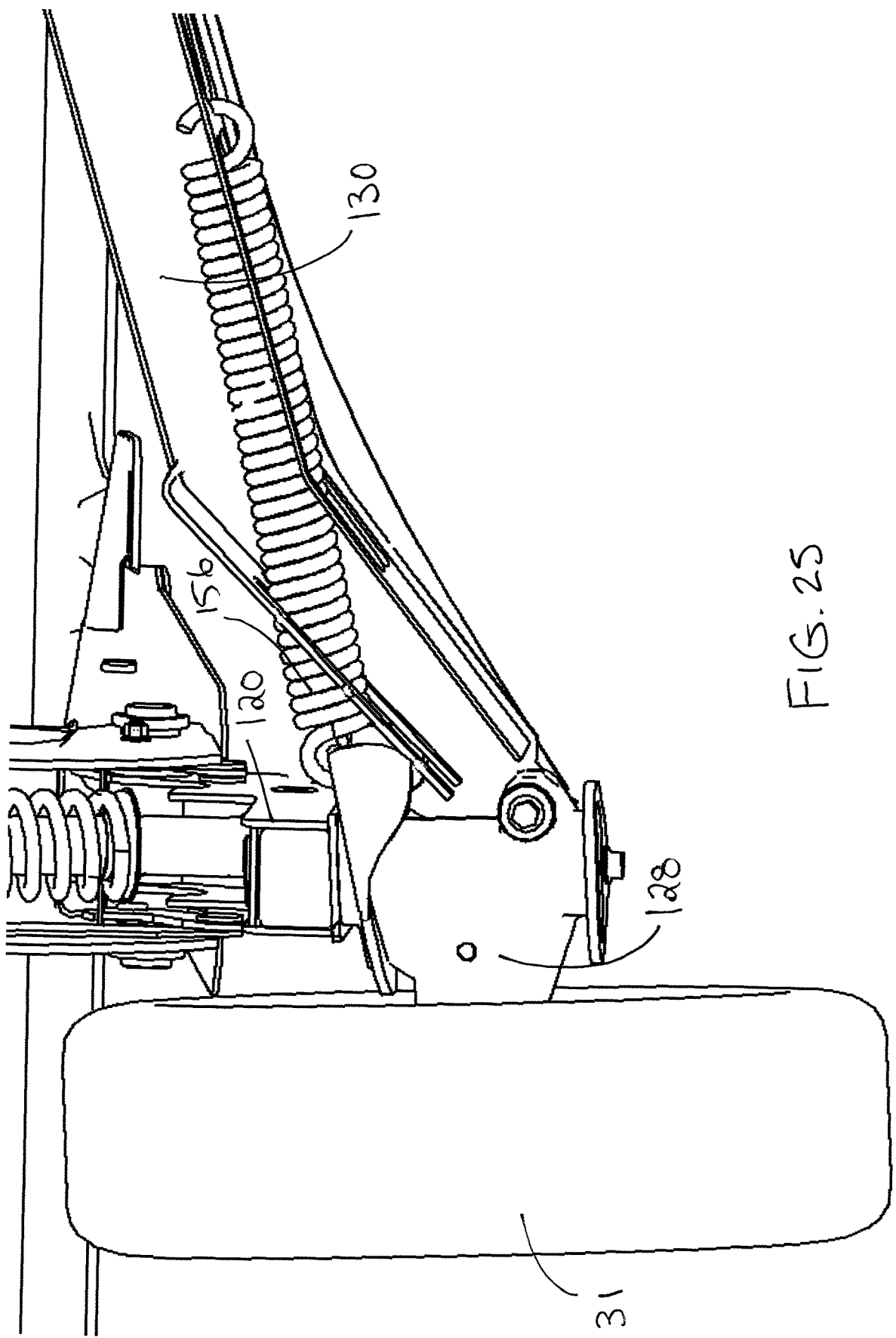
FIG. 25 is a perspective view of the counterbalanced spring of the connecting frame between the second wheel and the first wheel of the second wheel arrangement.
Figure 26:
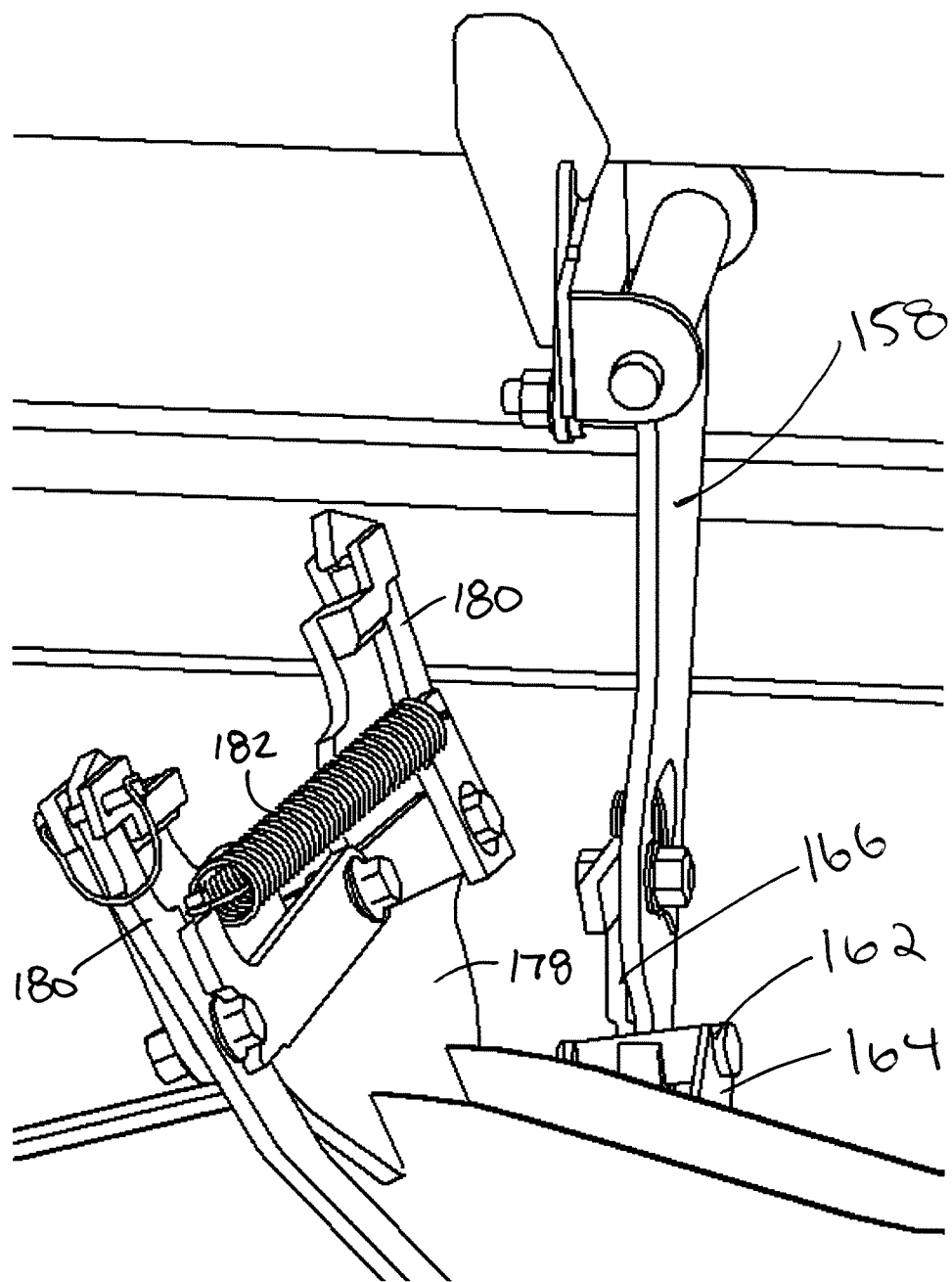
FIG. 26 is a perspective view of the field mounting arrangement in the field rolling orientations of the second wheel arrangement for supporting the second wheel of the second wheel arrangement relative to the header.
Figure 27:
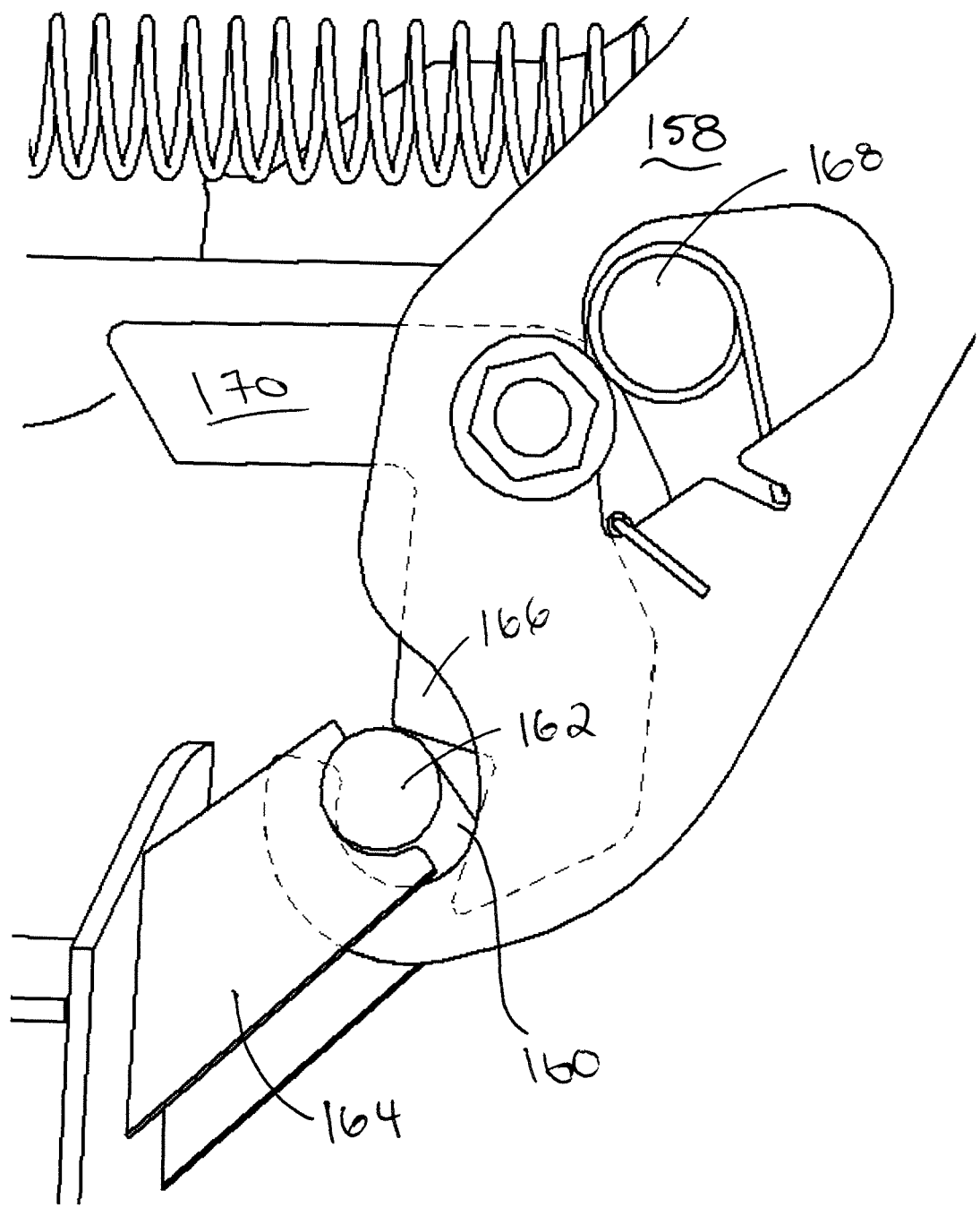
FIG. 27 is a partly sectional side view of the field mounting arrangement of FIG. 26.
Figure 28:
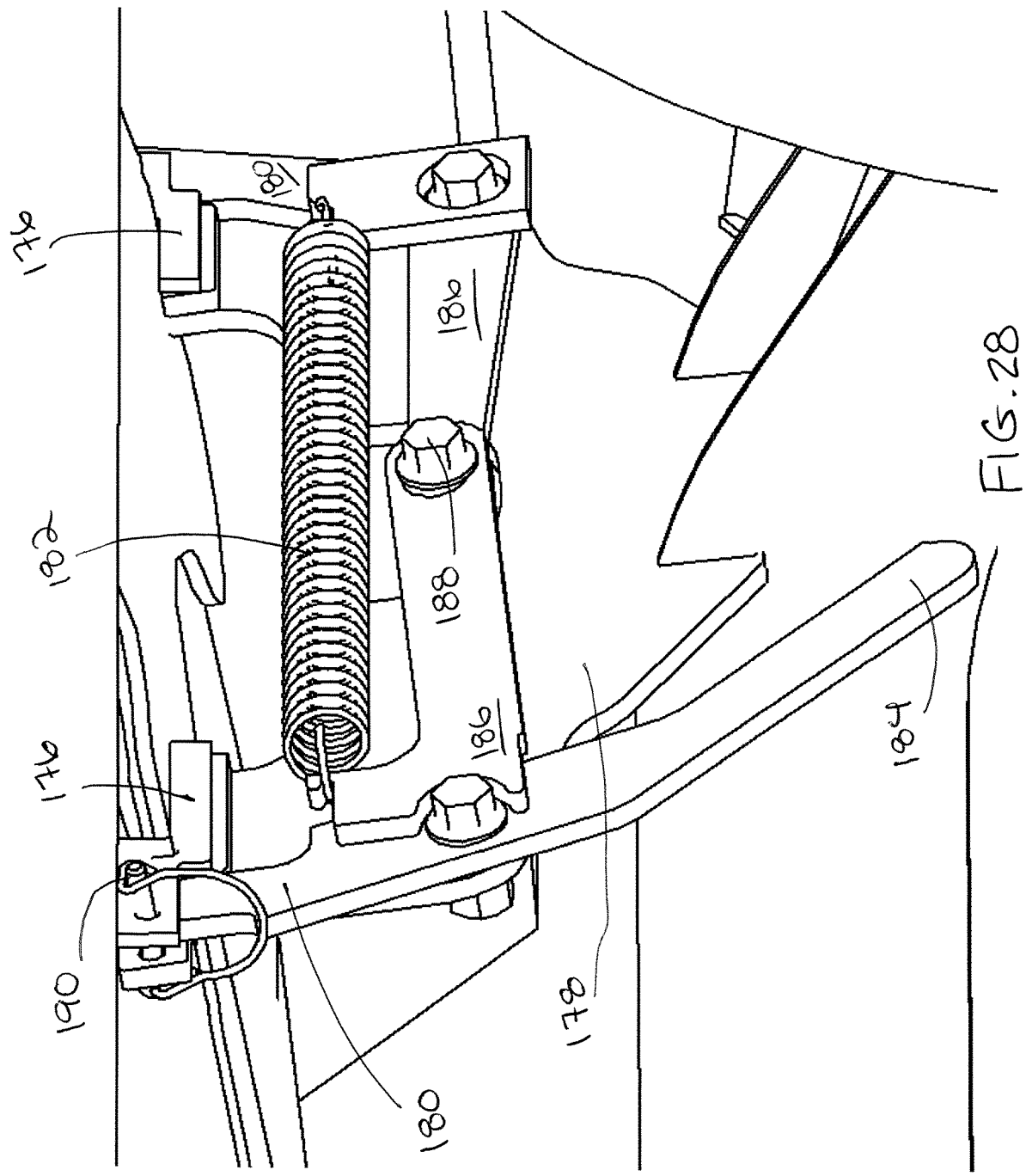
FIG. 28 is a perspective view of the transport mounting arrangement of the second wheel arrangement for supporting the second wheel in the transport position of the header.
Figure 29:
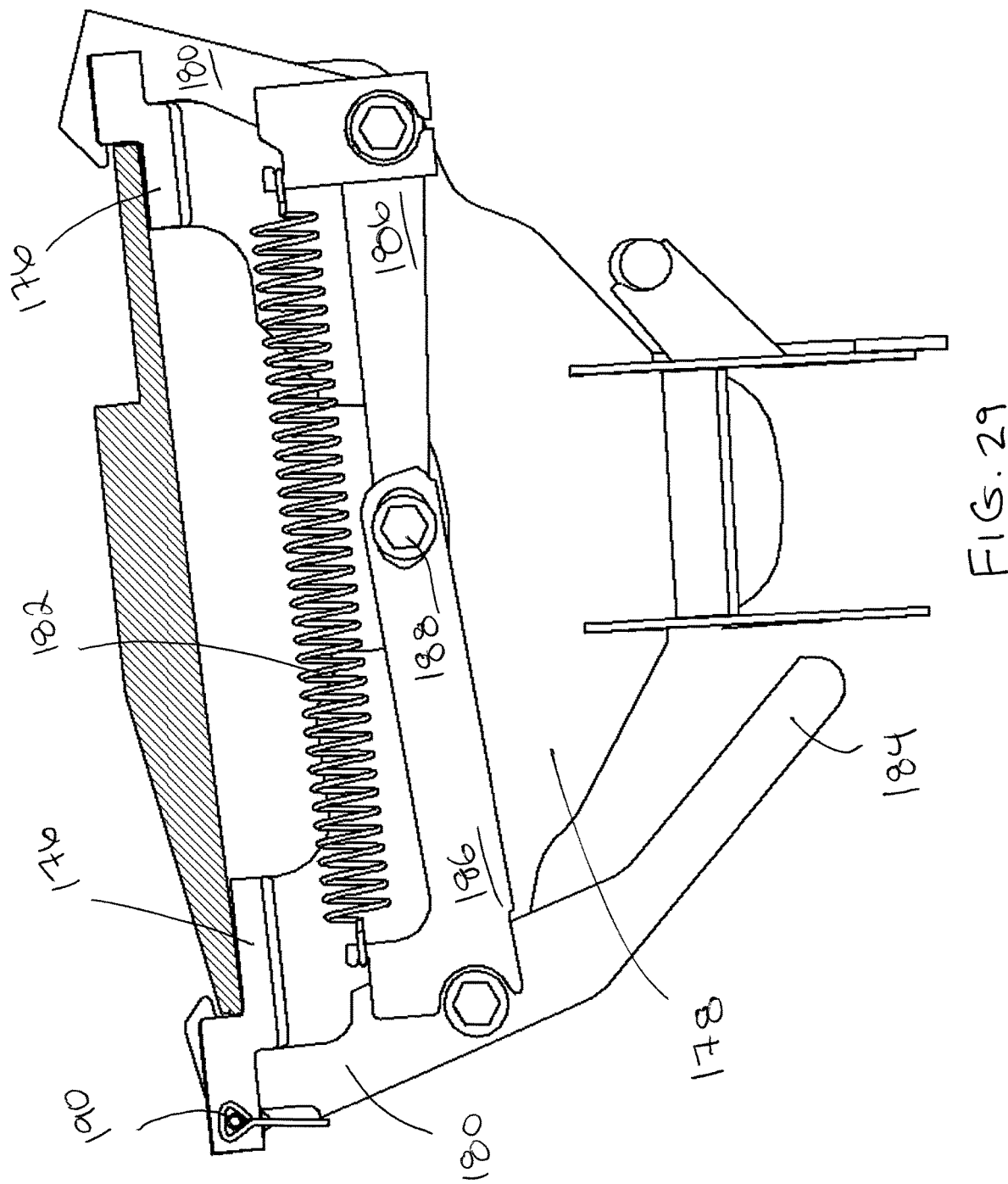
FIG. 29 is a partly sectional side elevational view of the transport mounting arrangement of the second wheel arrangement for supporting the second wheel in the transport position of the header.
Figure 30:
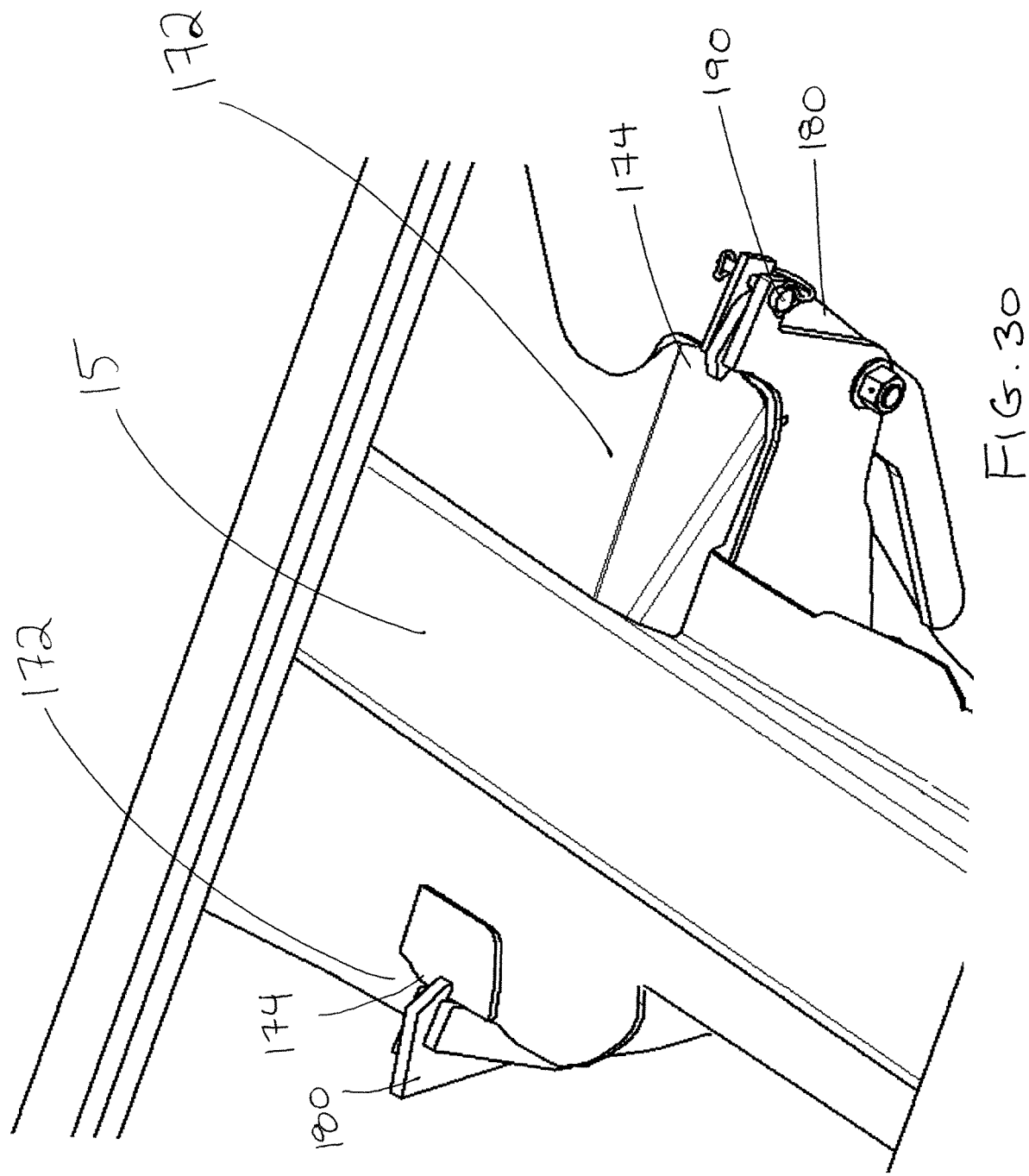
FIG. 30 is another perspective view of the transport mounting arrangement of the second wheel arrangement.

The field mounting arrangement 132 is used to support the second wheel 32 in raised elevation relative to the first wheel 31 when the first wheel is resiliently suspended by the suspension member 136 relative to the header frame in either of the gauge positions or the storage position. To assist in lifting the second wheel upwardly from the ground for securement by the field mounting arrangement as shown in FIG. 20, a counterbalance spring 156 is supported within the hollow crossbar of the connecting frame 130. The spring is fixed relative to the connecting frame at one end and is anchored relative to the axle body 128 at the opposing end at a location spaced upwardly from the pivotal connection of the connecting frame 130 relative to the axle body. In this manner, with the spring mounted under tension, the biasing provided by the spring 156 counters the downward forces of gravity acting on the second wheel 32 and the connecting frame 130 relative to the first wheel on the axle body so that an operator can manually lift and lower the second end of the connecting frame 130 relative to the first end on the axle body with relative ease.

Once raised, the second end of the connecting frame 130 is retained in an elevated position with the second wheel spaced above the ground while the first wheel remains engaged upon the ground using a mounting arm 158 supported at the rear of the header frame. A top end of the mounting arm 158 is pivotal on the main tube 14 of the header frame for relative pivotal movement about a pivot axis oriented generally in the forward working direction of the header.

An opposing bottom end of the mounting arm 158 is formed into a cradle 160 which receives a suitable connecting pin 162 of the connecting frame therein. The cradle of the mounting arm is formed of a narrow plate which is generally upright and parallel to the forward working direction. The recess formed within the cradle is open upwardly and to the rear to allow insertion of the connecting pin downwardly and forwardly into the cradle. The connecting pin 162 has a pin axis oriented approximately parallel to the second wheel axis of the second wheel 32 at a location spaced forwardly of the crossbar of the connecting frame 130 adjacent to the second end thereof. The pin 162 is supported by respective arms 164 mounted on the cross bar of the connecting frame 130 and which are spaced apart at opposing ends of the pin. The uninterrupted length of the connecting pin 162 between the supporting arms 164 is longer than the width of the cradle 160 in the same direction. The pin 162 is slightly undersized in diameter relative to the dimensions of the cradle 160 as well. In this manner the pin is free to slide slightly in the axial direction of the pin, while also being permitted to tilt slightly about an axis oriented in the forward working direction of the header relative to the cradle. The circular cross-section of the pin 162 also readily allows rotation of the connecting frame 130 relative to the cradle on the header frame about the longitudinal axis of the pin 162.

To retain the pin received within the cradle 160 in a mounted position of the second end of the connecting frame 130 relative to the header frame by the field mounting arrangement, a suitable latch member 166 is pivotally coupled to the mounting arm 158 above the cradle such that a retaining portion of the latch member is displaced across the mouth of the cradle 160 in a direction which is transverse to the direction that the pin 162 is released from the cradle as the latch member moves between latched and unlatched positions. A suitable torsion spring 168 biases the pivoting of the latch member 166 into the closed position across the cradle opening, thus preventing removal of the pin from the cradle. A lever 170 is connected to the latch member which can be manually deflected by an operator to displace the retaining portion of the latch member away from the open mouth of the cradle so that the connecting pin 162 can be removed from the cradle.

When the first wheel 31 is positioned in either of the gauge positions or the storage position of the second wheel arrangement, the movement of the swing arm relative to the header frame by the resilient suspension linkage or by movement of the swing arm between the different positions requires that the connection between the connecting frame 130 and the header frame at the second end of the connecting frame accommodate for the corresponding translational and rotational movements imposed upon the connecting frame. The arrangement of the connecting pin 162 within the cradle 160 as described above allows some freedom of movement between the second end of the connecting frame 130 and the header frame pivotally about two different axes as well as allowing some translational movement to follow the swing arm movement relative to the header frame while keeping the second wheel 32 raised upwardly relative to the first wheel 31.

In order to displace the second wheel arrangement from the field rolling orientation to the transport rolling orientation, the first wheel is positioned in the transport position by adjusting the suspension linkage with the assistance of the biasing linkage 146 carrying the weight of the first wheel relative to the header frame. The field mounting arrangement 132 is then released to allow the second wheel to be lowered into a similar elevation as the first wheel 31 with the spring 156 supporting the weight of the second wheel relative to the first wheel. With the second wheel positioned below the bottom of the header frame, the connecting frame can be pivoted from the field orientation to the transport orientation which in turn pivots both the first wheel 31 and the second wheel 32 together with the axle body from the field rolling orientation to the transport rolling orientation.

The second wheel 32 is then positioned in close proximity to the cutter bar at the front end of the header frame. At the front of the same support arm 15 that supports the swing arm at the rear end thereof, two load plates 172 are fixed onto or formed onto the header frame at laterally opposing sides of the support arm 15. The load plates are fixed relative to the frame member 15 of the header frame to protrude laterally outwardly from the opposing sides and define a pair of opposed flanges terminating at opposing free edges 174 oriented generally in the forward working direction of the header.

On the connecting frame 130 of the second wheel arrangement, two corresponding load plates 176 are formed on an upstanding frame portion 178 extending upward from the second end of the crossbar of the connecting frame 130. The upstanding frame 178 provides sufficient height to support the cutter bar spaced above the top of the second wheel 32 when the load plates 172 on the header frame are engaged upon the load plates 176 of the connecting frame at the second end of the connecting frame. The upper surfaces of the load plates 176 on the connecting frame define generally horizontal top load bearing surfaces engaging corresponding bottom surfaces of the load plates 172 on the header frame.

The load plates 172 on the header frame further define catches at the top side thereof adjacent the opposing free edges 174. The upstanding frame portion 178 of the connecting frame 130 further supports two latch members 180 thereon. Each latch member is pivotally supported on the connecting frame and defines a respective hook arranged such that the two hooks face inwardly towards one another to be suitably arranged for hooking over respective ones of the opposing free edges 174 of the load plates 172 on the header frame. A suitable biasing spring 182 is connected between the two opposing latch members at an intermediate location between the pivots at the bottom end thereof and the hooks at the top end thereof. The spring biases the latch members from released positions to latched positions thereof.

A first one of the latches includes a depending leg 184 acting as a lever for manually releasing and manually pivoting the first latch member into a released relationship unhooked from the respective catch at the free edge of a respective one of the load plates 172. Each of the latch members 180 further includes a connecting link 186 extending inwardly from the latch member towards the opposing latch member. A suitable pin and slot connection 188 between the inner ends of the connecting links ensures that the two latch members 180 are pivoted together between respective latched and unlatched positions thereof. More particularly, using the leg 184 on the first latch to pivot the first latch to an open position causes the corresponding inner end of the first connecting link to be displaced upwardly and in turn pivot the inner end of the other second link upwardly as well, which in turn displaces the second latch member 180 from the latched position to the unlatched position thereof together with the first latch member.

Once the load plates 176 of the connecting frame are aligned below the load plates 172 on the header frame and the second end of the connecting frame is displaced upwardly against the bottom of the header frame, the latch members can be automatically displaced to the unlatched position against the biasing of the spring 182 by ramped edges of the latch members that engage the load plates of the header frame. However, once the second end of the connecting frame 130 is fully engaged on the bottom of the header frame at the front side thereof, the hooks of the latch members 180 will be positioned over the corresponding catches at the top side of the load plates 172 so that the springs return the latch members to the latched position and fixedly couple the second end of the connecting frame to the header frame. A retainer pin 190 can be inserted through cooperating apertures in the connecting frame 130 in close proximity to one of the latch members 180 to ensure the latch members are retained in the latched position. Removal of the pin allows the latch to be manually released into the unlatched position thereof.

Figure 19:
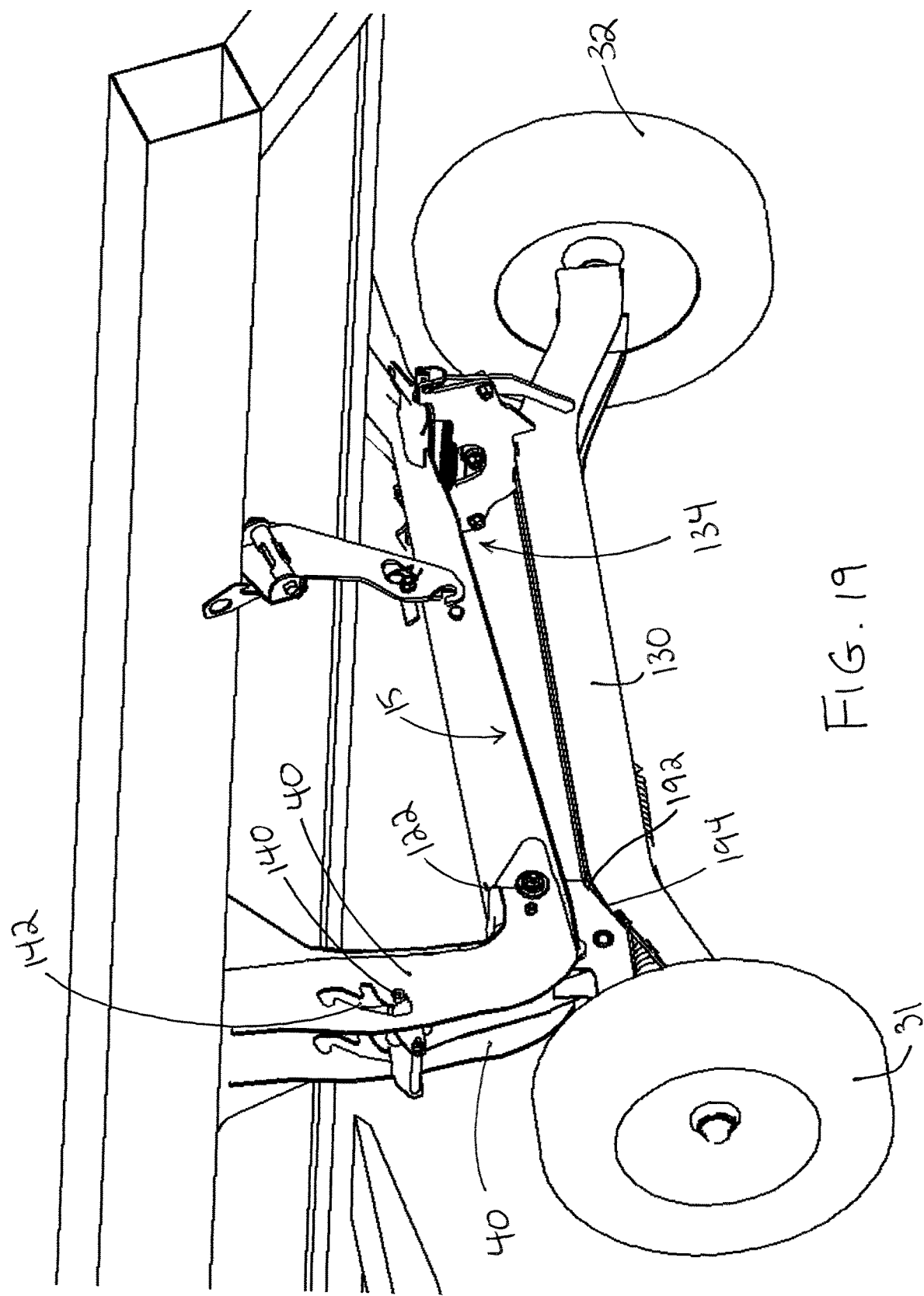
FIG. 19 is a perspective view of the second wheel arrangement in the transport position.

With the transport mounting arrangement engaged as shown in FIG. 19, a rear load plate 192 on the bottom of the swing arm defines a downward facing first load bearing surface which is engaged upon a corresponding upward load bearing surface of a corresponding rear load plate 194 mounted on the top side of the crossbar of the connecting frame 130 adjacent the first end thereof. The direct abutment of the load plate on the swing arm with the load plate on the connecting frame at the first end of the connecting frame adjacent to the first wheel 31 together with the latched arrangement and abutted load bearing surfaces between the header frame and the connecting frame 130 at the second end thereof adjacent the second wheel 32, ensures that the swing arm and connecting frame are locked in fixed relation to one another and to the header frame. In this manner the suspension member is isolated from any movement and the weight of the header is carried directly onto the wheels of the second wheel arrangement through direct connection of the header frame to the connector frame 130 at both front and rear sides of the header.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A header for a crop harvesting machine comprising:
a header frame having an elongate support structure arranged across a width of the header;
a mounting assembly attached to the header frame for releasably mounting the header frame on a vehicle in an operating position of the header for movement across ground carrying a crop to be harvested such that, when mounted on the vehicle, the header frame is supported on the vehicle in front of the vehicle for movement with the vehicle in a forward working direction transverse to the width of the header frame;
the header frame having a plurality of support arms mounted on the support structure and extending therefrom forwardly of the working direction;
a cutter bar extending across the width of the header having a cutter knife thereon for cutting a standing crop to be deposited into the header frame as the header is moved forwardly over the ground;
a feed draper mounted on the header frame for carrying the deposited crop along the header frame for collection at a discharge area of the header frame;
a first wheel arrangement on the header frame adjacent a first end of the header frame;
a second wheel arrangement on the header frame adjacent a second end of the header frame;
at least one of the first and second wheel arrangements comprising a suspended wheel arrangement, the suspended wheel arrangement comprising:
a wheel frame supporting a respective ground wheel thereon for rolling movement about a wheel axis of the ground wheel;
a suspension linkage supporting the wheel frame to be movable relative to the header frame;
the suspension linkage being movable between a plurality of different operating positions corresponding to different elevations of the wheel of the suspended wheel arrangement relative to the header frame;

the suspension linkage including a suspension member for resiliently suspending the wheel frame relative to the header frame in at least one of the plurality of operating positions of the suspension linkage;

at least one of the plurality of operating positions corresponding to the wheel frame supporting the wheel of the suspended wheel arrangement below a bottom side of the header frame so as to support the header frame spaced above the ground for rolling movement on the wheel along the ground; and a biasing-linkage acting on the suspension linkage of the suspended wheel arrangement as the suspension linkage is displaced between the plurality of different operating positions in opposition to a weight of the wheel frame suspended from the header frame;

the biasing-linkage being movable into a locked condition when located in at least one of the plurality of operating positions of the suspension linkage, the biasing linkage being isolated from the suspension linkage such that the biasing linkage does not act on the suspension linkage in the locked condition; wherein:

a first of the plurality of operating positions of the suspended wheel arrangement comprises a storage position in which the wheel is supported above the ground engaging surface of the header frame; and a second of the plurality of operating positions comprises a gauge position in which (i) the wheel frame supports the wheel of the suspended wheel arrangement below a bottom side of the header frame so as to support the header frame spaced above the ground for rolling movement on the wheel along the ground in the forward working direction of the header frame, and (ii) the suspension member resiliently suspends the wheel frame relative to the header frame.

2. The header according to claim 1 wherein at least one of the plurality of operating positions of the suspended wheel arrangement comprises a transport position in which the wheel is supported on the wheel frame for pivotal movement between a transport rolling orientation in which the wheel axis of the respective wheel is oriented in the forward working direction of the header frame and a field rolling orientation in which the wheel axis of the respective wheel is oriented transversely to the forward working direction for rolling of the wheel in the forward working direction.

3. The header according to claim 2 further comprising a latching arrangement arranged to selectively fix the wheel frame relative to the header frame such that the wheel frame is not resiliently suspended relative to the header frame by the suspension linkage in the transport position.

4. The header according to claim 1 wherein the header frame includes at least one ground engaging member having a ground engaging surface arranged to engage the ground and at least partially support the header thereon as the header is displaced across the ground in the operating position of the header, and wherein the suspended wheel arrangement is in the storage position.

5. The header according to claim 1 wherein a third of the plurality of operating positions comprises a second gauge position, wherein the wheel of the suspended wheel arrangement is resiliently suspended at a different elevation relative to the header frame in each of the two gauge positions.

6. The header according to claim 1 wherein the wheel frame of the suspended wheel arrangement comprises a swing arm pivotally coupled to the header frame and supporting the wheel thereon such that the wheel varies in elevation relative to the header frame as the swing arm pivots relative to the header frame, and wherein the suspension linkage is operatively connected between the swing arm and the header frame.

7. The header according to claim 1 wherein an adjustment portion of the suspension linkage is adjustably movable relative to a designated one of the header frame or the wheel frame so as to displace the suspension linkage between the plurality of different operating positions, the suspension linkage further comprising stops on the designated one of the header frame or the wheel frame that selectively fix the adjustment portion relative to the designated one of the header frame or the wheel frame such that biasing linkage is prevented from acting on the suspension linkage while the wheel frame remains resiliently suspended relative to the header frame by the suspension linkage in at least one of the operating positions of the suspension linkage.

8. The header according to claim 7 wherein the stops selectively fix the adjustment portion of the suspension linkage relative to the designated one of the header frame or the wheel frame such that biasing linkage is prevented from acting on the suspension linkage in each of the plurality of operating positions of the suspension linkage.

9. The header according to claim 7 wherein said designated one of the header frame or the wheel frame includes a track formed thereon and the adjustment portion of the suspension linkage comprises a follower supported for sliding movement along the track between the different operating orientations, the biasing linkage acting to displace the follower in one direction along the track.

10. The header according to claim 9 wherein at least some of the stops comprise detents formed along the track so as to be arranged to receive the follower selectively therein.

11. The header according to claim 10 wherein the biasing linkage acts on the follower transversely to the track in a direction which urges the follower into the detents.

12. The header according to claim 1 further comprising a hitch arm for connection at the first end of the header frame so as to apply a pulling force to the header from a tractor in a transport position of the header frame, the first wheel arrangement adjacent the first end of the header frame comprising the suspended wheel arrangement.

13. The header according to claim 1 further comprising a hitch arm for connection at the first end of the header frame so as to apply a pulling force to the header from a tractor in a transport position of the header frame, the second wheel arrangement adjacent the second end of the header frame comprising the suspended wheel arrangement.

14. The header according to claim 1 further comprising:
a hitch arm for connection at the first end of the header frame so as to apply a pulling force to the header from a tractor in a transport position of the header frame;
each of the first and second wheel arrangements includes a ground wheel supported for rotation about a respective wheel axis in which the ground wheel is pivotal between a transport rolling orientation corresponding to the wheel axis of the respective wheel being oriented in the forward working direction of the header frame and a field rolling orientation corresponding to the wheel axis of the respective wheel being oriented transversely to the forward working direction for rolling of the wheel in the forward working direction;
the first wheel arrangement further comprising:
a receiver mounted on an axle body and arranged to matingly connect with a mounting portion of the hitch arm;
an anti-rotation member movable between a locked position coupled between the axle body and the wheel frame to prevent pivotal movement of the axle body relative to the wheel frame from the field rolling orientation to the transport rolling orientation and an unlocked position in which pivotal movement of the axle body relative to the wheel frame is unrestricted by the anti-rotation member;

a biasing member acting on the anti-rotation member so as to bias the anti-rotation member towards the locked position;

an actuator member coupled to the receiver so as to be movable between a hitched position when a mounting portion of the hitch arm is mated with the receiver on the axle body and an unhitched position when the hitch arm is disconnected from the receiver;

the actuator member being operatively connected to the anti-rotation member such that the anti-rotation member is displaced against the biasing member into the unlocked position in response to the actuator member being displaced into the hitched position by the mounting portion of the hitch arm being mated with the receiver on the axle body.

15. The header according to claim 1 wherein the suspension member comprises a coil spring.

\* \* \* \* \*